US008424284B2

(12) United States Patent
Staffend et al.

(10) Patent No.: US 8,424,284 B2
(45) Date of Patent: Apr. 23, 2013

(54) HIGH EFFICIENCY POSITIVE DISPLACEMENT THERMODYNAMIC SYSTEM

(75) Inventors: Gilbert Staffend, Farmington, MI (US); Nancy A. Staffend, Minneapolis, MN (US)

(73) Assignee: Gilbert Staffend, Farmington, MI (US)

( * ) Notice: Subject to any disclaimer, the term of this patent is extended or adjusted under 35 U.S.C. 154(b) by 845 days.

(21) Appl. No.: 12/609,876

(22) Filed: Oct. 30, 2009

(65) Prior Publication Data

US 2010/0050628 A1 Mar. 4, 2010

Related U.S. Application Data

(63) Continuation-in-part of application No. 11/532,366, filed on Sep. 15, 2006, now abandoned, and a continuation-in-part of application No. 11/133,824, filed on May 20, 2005, now Pat. No. 7,556,015.

(60) Provisional application No. 60/718,029, filed on Sep. 16, 2005, provisional application No. 60/572,706, filed on May 20, 2004.

(51) Int. Cl.
*F02C 5/00* (2006.01)
*F01K 25/02* (2006.01)

(52) U.S. Cl.
USPC ................. 60/39.6; 60/650; 60/682; 123/236

(58) Field of Classification Search ................... 60/39.6, 60/519, 650, 682–683; 123/204, 221, 223, 123/224, 235, 236; 418/235, 241, 260
See application file for complete search history.

(56) References Cited

U.S. PATENT DOCUMENTS

| | | | | |
|---|---|---|---|---|
| 3,897,756 | A | 8/1975 | Upchurch | |
| 4,111,617 | A * | 9/1978 | Gale et al. | 418/61.3 |
| 5,410,998 | A * | 5/1995 | Paul et al. | 123/204 |

(Continued)

FOREIGN PATENT DOCUMENTS

EP 1995430 A2 11/2008

OTHER PUBLICATIONS

Atkinson cycle—Wikipedia, http://en.wikipedia.org/wiki/Atkinson_cycle, pp. 1-3, Aug. 21, 2009.

(Continued)

*Primary Examiner* — Hoang Nguyen
(74) *Attorney, Agent, or Firm* — Endurance Law Group, PLC

(57) ABSTRACT

Devices and methods for moving a working fluid through a controlled thermodynamic cycle in a positive displacement fluid-handling device (20, 20', 20") with minimal energy input include continuously varying the relative compression and expansion ratios of the working fluid in respective compressor and expander sections without diminishing volumetric efficiency. In one embodiment, a rotating valve plate arrangement (40, 42, 44, 46) is provided with moveable apertures or windows (48, 50, 56, 58) for conducting the passage of the working fluid in a manner which enables on-the-fly management of the thermodynamic efficiency of the device (20) under varying conditions in order to maximize the amount of mechanical work needed to move the target quantity of heat absorbed and released by the working fluid. When operated in refrigeration modes, the work required to move the heat is minimized. In power modes, the work extracted for the given input heat is maximized.

26 Claims, 19 Drawing Sheets

U.S. PATENT DOCUMENTS

| | | | | | |
|---|---|---|---|---|---|
| 5,433,179 | A | | 7/1995 | Wittry | |
| 5,522,356 | A | * | 6/1996 | Palmer | 123/236 |
| 6,079,966 | A | * | 6/2000 | Bearint et al. | 418/149 |
| 6,217,306 | B1 | * | 4/2001 | Seward et al. | 418/270 |
| 6,659,744 | B1 | | 12/2003 | Raymond, Jr. | |
| 7,556,015 | B2 | * | 7/2009 | Staffend | 123/221 |
| 2003/0074895 | A1 | | 4/2003 | McFarland | |

OTHER PUBLICATIONS

Miller cycle—Wikipedia, http://en.wikipedia.org/wiki/Miller_cycle, pp. 1-2, Aug. 21, 2009.

Miller Cycle Engines, Newcastle University, http://images.google.com/imgres?imgurl=http://sitemanager.ncl.ac.uk/images/projects/swan__2777.jpg&i . . . , p. 1, Aug. 21, 2009.

Driver et al., A Rotary Positive Displacement Heat Pump Compressor and Turbine Combined in One Rotor, (1996). International Compressor Engineering Conference. Paper 1181. http://docs.lib.purdue.edu/icec/1181.

Fischer, Feasibility Study and Hardware Design of a Pivoting-Tip Rotary-Vane Compressor and Expander Applied to a Solar-Driven Heat Pump (1978). International Compressor Engineering Conference. Paper 271. http://docs.lib.purdue.edu/icec/271.

* cited by examiner

HIGH EFFICIENCY POSITIVE DISPLACEMENT THERMODYNAMIC SYSTEM

CROSS REFERENCE TO RELATED APPLICATIONS

This application is a continuation-in-part of U.S. application Ser. No. 11/532,366 filed Sep. 15, 2006, which claims the benefit of U.S. Provisional Patent Application Ser. No. 60/718,029 filed Sep. 16, 2005 and is a continuation-in-part of U.S. patent application Ser. No. 11/133,824 filed May 20, 2005, now U.S. Pat. No. 7,556,015, which claimed priority to U.S. Provisional Patent Application Ser. No. 60/572,706 filed May 20, 2004.

BACKGROUND OF THE INVENTION

1. Field of the Invention

This invention relates to a thermodynamic system operating through a positive displacement compressor-expander device, and more particularly to a highly efficient positive displacement system.

2. Related Art

The subject invention pertains to improvements across a wide spectrum of applications in the field of thermodynamics. Therefore, an overview of the various terms and categories within the field of thermodynamics will provide a proper context for this invention. A thermodynamic system is a set of components that control the flow and balance of energy and matter in that part of the universe under consideration. Thermodynamic systems may be described as closed or open systems, as these terms are generally understood by those of skill in the art. A closed-system may be defined as a fixed mass under study. An open-system may be defined as a fixed region in space under study. An open-system will exchange mass with its surroundings, but a closed-system will not.

A cycle is a set of thermodynamic processes whose initial and final states are identical. A cycle is commonly represented in engineering practice by drawing the set of processes on pressure-volume (p-V) diagrams or temperature-entropy (T-s) diagrams. There are many common cycles used in thermodynamics including the Otto cycle, Diesel cycle, and Brayton cycle. These cycles can be used to develop both heat engines and refrigeration systems. The Carnot cycle models the most efficient cycle for a heat engine or refrigeration system.

A particular focus in the study of thermodynamics is that of energy, or the ability to do work. According to the universally understood first law of thermodynamics, the total energy of a system and its surroundings is conserved. Energy may be transferred into a thermodynamic system by heat input, work input (e.g. by compression), and/or mass input. Conversely, energy may be extracted from a thermodynamic system by heat output (cooling), work output (e.g. by expansion), and/or mass output. In the case of positive displacement pump systems, as viewed from a thermodynamics perspective, energy is transferred mechanically by force applied to a body and its resulting displacement, and through heat transfers. Systems may be designed to reduce the overall energy required to operate a thermodynamic system, leading to increased operating efficiencies, lower operational costs, and/or reduced greenhouse gas emissions.

Positive displacement type thermodynamic systems may be expressed in real life through various constructions or applications. For example, a positive displacement thermodynamic system may be embodied in a heat engine, in which combustible material is "burned" within an enclosed space and the heat energy is converted into work. In heat engines the direction of heat transfer is from high temperature to low temperature. Heat may also be moved from a lower temperature to a higher temperature in a refrigeration system by applying work. Such systems commonly function on either a thermodynamic gas cycle or vapor cycle refrigeration.

Heat engines may be classified as being either of two types: internal combustion or external combustion. There are two common types of internal combustion engines—spark ignition and compression ignition. Both may be implemented through piston/cylinder devices that typically operate on a four-stroke cycle, although other stroke combinations have been proposed. Such internal combustion engines may have one or more cylinders, each configured with an intake and exhaust manifold. Each manifold is typically fitted with a valve to control the flow of a working fluid to and from the cylinder. The operation of a compression ignition engine, such as a diesel engine, includes the following events:

The cycle begins with the piston in a "top-dead center" (TDC) position. The top-dead center is a reference to the crank position at this time. At this point, the engine will have just completed the previous cycle and is prepared to begin a new cycle.

Stroke 1—Intake (e.g., Process 1-2 in FIG. 2A): The cycle starts with the intake-valve open and the exhaust-valve closed. A crankshaft pulls the piston away from top-dead center. This creates a negative pressure in the cylinder relative to the outside air and results in a charge of fresh air being pulled into the chamber.

Stroke 2—Compression (Process 2-3 in FIG. 2A): As the crank continues to rotate, the intake-valve is shut. The piston moves back toward the top-dead center position compressing the air trapped in the cylinder. The temperature and pressure in the cylinder both rise as a result of the compression.

As the piston approaches top-dead center, a small quantity of fuel is injected into the chamber. Because of the high temperatures in the cylinder, the fuel-air mixture created by the injection spontaneously ignites, releasing the fuel's chemical energy. The temperature increases dramatically as a result. The pressure may or may not increase, depending on the manner of heat release.

Stroke 3—Expansion (Process 3-4 in FIG. 2A): The high temperature/pressure combustion gas forces the piston away from top-dead center. This stroke is often referred to as the power stroke. Near the completion of the stroke, the exhaust-valve opens and the product gases start to rush from the cylinder.

Stroke 4—Exhaust (Process 4-1 in FIG. 2A): As the crank continues to rotate, the motion of the piston continues to scavenge the exhaust gases from the cylinder. Near the completion of the stroke, the exhaust-valve closes and the intake-valve opens to prepare for the next cycle.

In a typical reciprocating piston engine, a slider-crank device attached to the piston converts the mechanical energy created during the power stroke to rotary motion. Mechanical energy leaves the engine via the rotating crankshaft. In a four-stroke engine, two rotations of the crankshaft are required to complete one cycle. Unconverted thermal energy from the combustion process leaves the engine via the escaping exhaust gas, and by a cooling fluid used to limit the engine components' maximum operating temperatures.

In these and other thermodynamic scenarios, the ratio of theoretical work output to theoretical heat input is an important parameter in engine design. This is known as thermal efficiency, something that engine designers attempt to maximize. The ratio of chamber volume at bottom-dead center to top-center (or its equivalent in rotary type devices) is known as the compression ratio. It is often said that increasing the compression ratio will increase the thermal efficiency of an engine. But such increased thermal efficiency can be obtained only so long as the increased compression ratio results directly in the capability to burn more fuel by bringing more air into the combustion chamber. This necessary condition is not sufficient to produce the expected efficiency increase without many other conditions being met. Volumetric efficiency is primary among variables including valve timing, spark and combustion timing, reaction kinetics, time available (RPM), fuel placement, distribution, atomization, etc. These all control peak temperatures and pressures actually developed as well as heat and noxious byproducts of combustion per gram of fuel. Volumetric efficiency is the foundation for all other measures because it is the ratio between the mass of fluid (air) actually delivered compared to the mass theoretically contained in the working volume at any stipulated temperature and pressure.

In conventional piston engines, the compression ratio is equal to the expansion ratio. In some non-conventional piston engines, the expansion ratio may be increased relative to the compression ratio, producing asymmetric compression and expansion processes. Such non-conventional engine designs are considered advantageous on the belief that a longer expansion can be used to extract more work from a given heat input, thereby increasing thermal efficiency.

In a typical 4-stroke internal combustion engine, the power-stroke is just one of the four strokes (hence it is available for only 180 out of 720 degrees of crank rotation). To enable smooth-running performance, energy is stored in a large and heavy flywheel during the power-stroke for release in the other 540 degrees. If a more constant power supply were available, i.e., more than a single 180 degree power-stroke per 720 degrees of crank revolution, it might be possible to reduce the size of the flywheel (or its equivalent), which would lead to a reduction in the overall size and weight of the engine—an especially important concern in mobile applications.

There are two major differences between a spark ignition and a compression ignition engine. The first difference has to do with how fuel and air are combined. In a spark ignition engine, fuel is mixed with air prior to entering the cylinder, and a spark ignites this mixture as the piston approaches top-dead center. In a compression ignition engine, on the other hand, fuel is not pre-mixed with air prior to entering the cylinder. The second difference involves how engine speed and torque is controlled. In spark ignition engines, a throttle valve constricts the air flow into the cylinder, and fuel is added to match the amount of air pulled into the cylinder. In a compression ignition engine, however, there is no throttle valve and the engine speed and torque is controlled by the amount of fuel injected into the cylinder or cylinders.

This "throttling" distinction between spark- and compression-ignitions engines is significant because the operation of a spark ignition engine is often idealized by modeling the actual cycle using a thermodynamic cycle called the Otto cycle, as shown in FIGS. 1A and 1B. The Otto cycle is represented by a reversible-adiabatic (isentropic) compression, a constant volume heat addition, isentropic expansion, and a constant volume heat removal (due to the exhaust of the combustion gas). In the model, the pressure at state 4 is higher than the pressure at state 1. This means that potential work is lost when the exhaust valve is open, as far as 45 degrees before Bottom Dead Center. A plot of pressure versus volume actually measured for a typical spark ignition engine is shown in FIG. 1C, with the area circumscribed by the curve representing the work that is done at wide-open throttle. The area enclosed on the PV trace or indicator diagram from an engine represents work done by the working fluid on the piston. The "indicated mean effective pressure," or imep, is a measure of the indicated work output per unit swept volume, in a form independent of the size and number of cylinders in an engine or its engine speed. The indicator diagram of FIG. 1C shows the imep as a shaded area equal to the net area of the indicator diagram.

In a 4-stroke cycle, the negative work occurring during the induction and exhaust strokes is termed the pumping loss. This negative work is subtracted from the positive indicated work of the other two strokes. Returning to the "throttling" distinction between spark- and compression-ignitions engines, when an engine is throttled down from wide open throttle to the maximum speed allowed on superhighways, the pumping loss increases thereby reducing engine efficiency. Pumping losses increase dramatically beyond those shown for the common speeds of city driving. In FIG. 1C, the shaded area has the same volume scale as the indicator diagram, so the height of the shaded area must correspond to the imep. Those who are skilled in this field will appreciate that the peak pressure generated by a thermodynamic system such as an engine is commonly ten times (10×) or greater more than the mean pressure that it generates. And the mean pressure is available for only one of the four strokes, i.e., 180 degrees out of 720.

Those skilled in the art will readily appreciate that the indicator diagram is a recognized depiction of the work produced during a cycle. Tracing pressure versus piston position implies equivalence between a unit of time and a unit of piston movement. The work reflected in the cycle diagram is sometimes mistaken for a portrayal of power. Work may be shown in relation to piston position but power relates to the first derivative of piston position, work per unit time or PdV/dt. Those skilled in the art will acknowledge that when the indicator diagram's picture of work is remapped into the power domain it follows the shape of a sine wave whose value at TDC is zero. This is true in spite of the fact that the piston's linear speed is constrained by the uniform angular velocity of the flywheel throughout its stroke.

Tracing PdV as if it were an adiabat the Otto, Diesel, Dual Cycle and indicator diagrams not only hides the times at which work is available as power, but also disguises the time spent releasing heat without work. Standard analytical practices fail to measure lost thermal potential except to take note of reduced mechanical efficiency, another average which has been carved away from shaft angle. Excluding parasitic loads and friction, high speed mechanical efficiencies drop to substantially due primarily to losses described above. Industry and laboratory measures complacently accept average cycle yields rather than identify peak and actual power per degree of shaft rotation.

The prior art has long recognized the inefficiencies which exist in a real-world thermodynamic system operating on the Otto cycle, and innovators have sought to improve the efficiencies in various ways. One well-known technique to capture work otherwise lost is to enable a longer expansion stroke than the compression stroke, described earlier as asymmetric expansion-compression. One example of such a device is known as the Atkinson cycle engine. Original Atkinson cycle engines used a linkage to achieve a longer expansion stroke than compression stroke. More recent implementations of the Atkinson principal, for example those used in current production Toyota Prius vehicles, deliver the equivalent of a shorter compression stroke by bringing less air into the combustion chamber and at a lower pressure through variable valve timing. In these situations, the piston moves through the same length compression stroke and expansion stroke as used in a conventional engine, but the intake valves are left open during the initial stages of the compression stroke. Instead of compressing the air charge early in the stroke, the air is pushed back out of the open intake valve. After a short delay, the intake valve is closed and the actual compression stroke begins. This approach creates an asymmetric ratio of compression-stroke volume to exhaust-stroke volume and ensures complete recovery of the mechanical energy in the combustion gas. Unfortunately, it also results in a portion of the compression-stroke being wasted or going unused, thereby under utilizing the compressor volume and contributing to inefficiencies such as friction and heat loss. The largest penalty associated with the wasted compression stroke is the corresponding reduction in the mass of air inducted to the engine. With less air in the cylinder, less fuel can be added and less power produced. Atkinson cycle engines are known for good thermal efficiency but relatively poor power-to-volume and power-to-weight ratios.

The potential gain in work from a device such as the Atkinson cycle engine is illustrated by the highlighted regions in FIGS. 1D and 1E, in which the expansion phase is extended all the way to state 5. While this gain in work does improve the overall thermodynamic efficiency of the engine, the reduced compression volume in these engines tends to reduce the relative power output of the engine, as previously described. Therefore, current Atkinson cycle approaches have failed to achieve full thermodynamic benefits. This is also the case with other devices that have attempted to capture lost work by producing asymmetric compression and expansion processes. For reference, the volumetric efficiency of un-throttled spark ignition and diesel engines ranges from 75% to 90% according to reliable sources. The volumetric efficiency is much lower by design in methods now used to approximate an Atkinson cycle.

Compression ignition engines suffer from the same waste of mechanical energy when the exhaust valve opens before the combustion gases are expanded completely to atmospheric pressure. Compression ignition engines may be modeled using either a diesel cycle (FIG. 2A) in which the heat addition is modeled as being in constant pressure, or a dual cycle (FIG. 2B) in which the heat addition is modeled as part constant volume and part constant pressure. In either case, the efficiency can, in theory, be improved by using a longer expansion stroke than compression stroke. This increase in thermodynamic efficiency is indicated in FIGS. 2A and 2B by the added "tails" extending to respective states 5 and highlighted as potential gains. As with attempts to achieve this gain in spark ignition engines, as in FIG. 1D, attempts to capture this theoretical gain in both diesel and dual-cycle thermodynamic systems have been impractical or incomplete.

An inherently efficient gas turbine stands in contrast to the inherently inefficient positive displacement heat engines described above. As shown schematically in FIG. 3A, a gas turbine is an open flow device, but its operation can be explained in terms of the positive-displacement four-stroke engines discussed previously. A rotary compressor at the front of the turbine engine provides the intake and compression functions on a continuous stream of inlet air. Fuel is injected in the combustion chamber downstream of the compressor and ignited, releasing the energy in the fuel. The high-temperature combustion gases flow downstream to a turbine, which provides the expansion and exhaust function. The expanding gases through the turbine turn a set of blades which allows a path for mechanical energy to leave the engine. The operation of a gas turbine can be represented by the schematics shown in FIGS. 3A and 3B. The arrangement of FIG. 3A is referred to as open-loop and the arrangement of FIG. 3B is referred to as closed-loop. An idealization of this process is the Brayton cycle as shown in FIGS. 3C and 3D. The compression process (from 1 to 2) is modeled as being isentropic, the heat addition (from 2 to 3) is constant pressure, and the expansion through the turbine (from 3 to 4) is isentropic. The heat removal process (from 4 to 1) may be accomplished in one of two ways: by rejecting the exhaust gas, as shown in FIG. 3A, which is an open thermodynamic cycle also known as an open-loop system; or by using a heat exchanger, as shown in FIG. 3B, a closed cycle or closed-loop system.

In the Brayton cycle, the recovery of energy from the combustion gas is complete, since the expansion (from 3 to 4) is to atmospheric pressure. Note that the expansion process in FIGS. 3C and 3D defines a substantially greater volume than the compression process. This asymmetric ratio is required in order for complete energy recovery to occur. The compressor blade design sets the compression ratio ($r_c=V_1/V_2$) of the rotary compressor, or alternatively the pressure ratio ($r_p=P_2/P_1$). The expansion ratio for the turbine ($r_e=V_4/V_3$) is determined by thermodynamic relationships dependent on the compression ratio and the amount of heat added in the process from 2 to 3.

Turbine-based thermodynamic systems are highly efficient at recovering energy and operating at nearly ideal conditions. However, turbine-based thermodynamic systems are not well suited to low speed and highly variable operating conditions. As a result, turbine-based thermodynamic systems and engines are not typically used for automotive transportation and other such systems in which variable loads are common.

Moving away from heat engines, another type of thermodynamic system that can be implemented through a positive displacement compressor-expander device is refrigeration. Instead of extracting work from the movement of heat from a higher temper to a lower temperature (a heat engine) a refrigerator uses work to move heat from a lower temperature to a higher temperature. Just as heat engines implemented through positive displacement compressor-expander devices are plagued by low-efficiency issues, refrigeration systems face similar problems.

Broadly defined, refrigeration systems may be operated to provide targeted cooling or heating. The term "heat pump" is gaining prominence as an inclusive term for refrigeration because it more generically describes the process of moving heat from a low temperature to a higher temperature by supplying mechanical work. A heat pump integrated with an air conditioner is a refrigeration system that can be used to heat a home as well as cool it. In both heating and cooling modes it may be configured to use the same permanently installed inside and outside heat exchangers, with the direction of heat flow merely reversed.

A common method for refrigeration is based on the vapor-compression cycle as shown in FIGS. 4A and 4B. The refrigerant changes phase as it passes through the components. One may observe that the direction of travel (shown with notations 1, 2, 3, 4) through this cycle is reversed from the heat engines shown in the preceding figures. An evaporator is stationed in the region to be cooled. Saturated vapor exits the evaporator at state 1, and is then compressed to an elevated pressure and temperature at state 2. As the refrigerant passes through the condenser, heat is transferred to the surrounding atmosphere and the refrigerant is condensed to a saturated liquid. The refrigerant is then passed through an expansion (or throttling) valve, where it flashes into a mixture of liquid vapor. The resulting low-temperature, low-pressure refrigerant then passes through the evaporator absorbing heat from the refrigerated space. The ability to do work is lost when passing through the expansion valve from high pressure at state 3 to low pressure at state 4. An alternative to the expansion valve would be to expand through an energy conversion device, which would bring the refrigerant to state 4', as illustrated in the Ts diagram of FIG. 4B. If accomplished, this would have two positive effects—it would reduce the net work into the unit and also increase the amount of energy that could be absorbed in the evaporator. Both of these effects would be expected to improve the coefficient of performance for the refrigerator. However, while these benefits have been theoretically forecast, practical units have not been constructed due to the difficulty of design and construction, and with the constraints of providing a low-cost energy recovery device that is sufficiently reliable.

Referring to FIGS. 5A and 5B, it is also well known that the Brayton cycle, as discussed previously, may be used to develop a refrigeration system. When the Brayton cycle is operated as a refrigeration system, the cycle is run in the opposite direction, counter-clockwise instead of clockwise. If air is used as a working fluid, it will not undergo a phase change, as it would in vapor-compression refrigeration. In an air cycle refrigeration device, an expander naturally recovers the available energy in the working fluid as it passes from state 3 to state 4, as illustrated in FIGS. 5A and 5B. However, practical attempts to implement this kind of theoretical system have relied on turbine-based systems in which the compression ratio used by the device is fixed by blade geometry. Furthermore, constraints of high volume throughput and steady state operation also limit applications for this technology to certain, very specified and limited settings only. As a result, if the refrigeration unit is producing too much cold air, the unit is cycled on and off to maintain proper temperatures. A more efficient approach would be to only make as much cold air as is needed. At reduced cooling (or heating) loads, significant economies would result from bringing heat exchanger temperatures closer to both indoor and outdoor temperatures, thereby also reducing the temperature difference (lift) the system would have to deliver. Present turbine-based systems are not practically suited to achieve this type of highly efficient operation.

Accordingly, there is a need in the art to provide an improved thermodynamic system which is positive displacement structured rather than turbine-based, and which is capable of achieving highly efficient operation whether configured as a power system or a refrigeration system, and of maintaining its efficiency at low operating speeds and under variable load conditions.

SUMMARY OF THE INVENTION

A method is provided for moving a working fluid through a controlled thermodynamic cycle in a positive displacement fluid-handling device in such a manner that heat is moved with a minimal theoretical application of work (in the case of a refrigerator), or that the maximum theoretical amount of work is extracted from a given movement of heat (in the case of a heat engine). As used here, the terms minimum/maximum refer to the ability of the device to extract all of the mechanical energy invested into the working fluid, save frictional and/or heat losses consistent with the second law of thermodynamics. This method provides a working fluid at an inlet pressure. The working fluid comprises a compressible substance capable of intermittently storing and releasing mechanical energy. At least one compression chamber and one expansion chamber are provided. Each chamber has a respective displacement volume (swept volume) and a definable volumetric efficiency. A fixed quantity of working fluid is volumetrically compressed in the compression chamber, and similarly a fixed quantity of working fluid in the expansion chamber is volumetrically expanded. The pressure differential is created in the working fluid relative to the inlet pressure during one of the compressing and expanding steps. Following this, a variable amount of heat is moved into or out of the working fluid. Working fluid is returned to inlet pressure during the other one of the compressing and expanding steps entirely within the respective compression or expansion chamber. The step of returning working fluid to inlet pressure includes adjusting the expansion chamber's displacement volume relative to that of the compression chamber, based on well known thermodynamic relationships which depend on the compression ratio and heat exchange prior to entering the expander section. This step occurs without decreasing the volumetric efficiency of the compression and expansion chambers.

The subject method, when operated within the context of a positive displacement fluid-handling device, results in a highly efficient thermodynamic system. When the invention is implemented as a refrigerator, heat is moved by a minimum theoretical application of work. When implemented within a power cycle, this invention results in the production of a maximum of theoretical work from a given amount of heat in expansion. And even more specifically, when the power cycle implementation includes combustion, this invention produces a maximum of theoretical heat from a regulated combustion input pressure, quantity of fuel, and burning time in order to meet the guaranteed repeatability constraints of both heat produced and combustion byproducts. In other words, the method and device of this invention is readily adaptable to a refrigeration system or a heat engine. If the device is operated as a refrigeration system, it minimizes work input. If the method and device are operated as a heat engine, it maximizes work output.

According to another aspect of this invention, a positive displacement rotating vane-type device is provided for operating a highly efficient thermodynamic cycle. The device comprises a generally cylindrical stator housing having a central access and longitudinally spaced, opposite ends, as exemplified in FIG. 6. A rotor is rotatably disposed within the stator housing, where it establishes an interstitial space therebetween. A plurality of vanes are operatively disposed between the rotor and the stator housing for dividing the interstitial space into intermittent compression and expansion chambers. A compression chamber outlet and an expansion chamber inlet respectively communicate with the interstitial space. A high-pressure heat exchanger fluidly adjoins the compressor outlet and the expander inlet. An expansion chamber outlet and a compression chamber inlet also respectively communicate with the interstitial space. A low-pressure side heat exchanger fluidly adjoins the expansion chamber outlet and the compression chamber inlet. At least one rotatable valve is disposed adjacent the expansion outlet, with an aperture formed therein for conducting the passage of a working fluid. Similarly, at least one rotatable inlet valve plate is exposed adjacent the compression chamber inlet, and this valve also has an aperture formed therein. The outlet and inlet valve plates can be rotated with respect to the stator housing so as to manage the thermodynamic efficiency of the device under varying conditions of constant operating pressure, volume and temperature.

The rotating valve plate arrangement of this device represents one alternative embodiment which enables the device to maintain a precise adjustment of required continuously varying asymmetric ratios between volumetric compression and expansion in order to exactly minimize the amount of mechanical work needed to move the target quantity of heat absorbed and released by the working fluid.

In refrigeration mode, the subject method and device helps to minimize the work required to move the heat. In power mode, the devices help to maximize the work extracted from the given input heat. Said another way, this method, as enabled through its various disclosed and exemplary embodiments, increases the coefficient of performance for refrigeration systems, and increases the thermal efficiency of heat engines. For combustion applications enabled by precise control capability, fuel may be burned in a chosen optimum manner, such as to discharge the most heat with a minimum of noxious byproducts. Advantageously, the capability for on-the-fly re-adjustment of the relationship between compression and expansion provides for the establishment of independent pressure targets without sacrificing volumetric efficiency resulting in maximum benefit with a minimum of energy expended.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENTS

Figure 6:
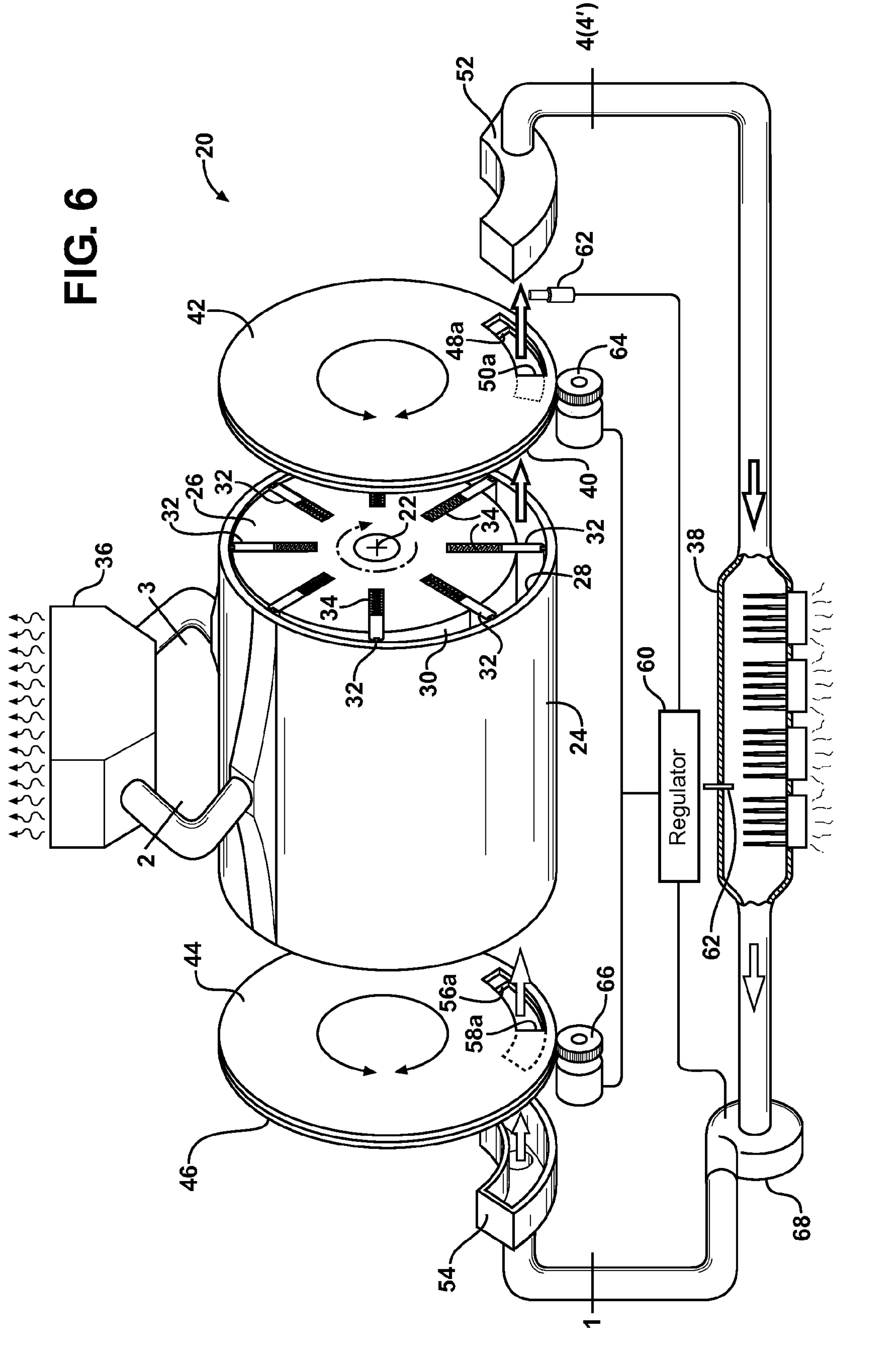
FIG. 6 is a simplified, partially exploded view of a positive displacement rotating vane-type device configured as a refrigeration system, according to one embodiment of this invention.

Referring to the Figures, wherein like numerals indicate like or corresponding parts throughout the several views, a positive displacement fluid-handling device, according to one embodiment of this invention, is generally shown at 20 in FIG. 6. In the embodiment depicted here, the device 20 takes the form of a rotary style positive displacement compressor/expander having an axis of rotation 22 oriented generally horizontal as viewed from FIG. 6. An outer stator portion 24 surrounds an internal rotor 26 supported for rotation about the axis 22. In this configuration, the stator 24 is static and the rotor 26 rotates with respect to the stator 24. The space between the inner wall 28 of the stator 24 and the outer surface 30 of the rotor 26 defines multiple working chambers which, as will be described in greater detail subsequently, form respective compression and expansion chambers. Extendible vanes 32 are supported in the rotor 26 and project outward into sliding contact against the inner wall 28 of the stator 24 to form dividing lines between the multiple expansion and multiple compression chambers. The vanes 32 may be fabricated of various designs and constructions, but in this instance are shown as linearly retractable members sealing at their outer tips to prevent the leakage of working fluid from one side to the other due to a pressure differential. A sealing interface may be accomplished in any suitable fashion, such as with commercially available neoprene and related self-lubricating plastics. The vanes 32 may be backed by springs 34 and/or servomotor drive devices (not shown) in a manner described more fully in applicant's co-pending applications first referenced above and incorporated here by reference. In this embodiment of the invention, the vanes 32 each comprise sweeping elements which create compression or expansion chambers. When the rotor turns, the vanes work to volumetrically compress, or expand, working fluid trapped between the adjacent vanes 32.

In FIG. 6, the rotor 26 is shown having a generally clockwise rotary direction. This causes the compression of working fluid on the front half of the device 20, and the expansion of working fluid on the rearward side of the device 20. Working fluid trapped between adjacent vanes 32 on the compression side of the device 20 generally result in mechanical energy being stored in the working fluid by the progressive reduction in volume of the respective compression chambers.

As with any thermodynamic system, there must be a capacity to exchange heat between the working fluid and the surroundings. In the embodiment of FIG. 6, the device is shown operating as a refrigerator having a high side heat exchanger 36 operatively connected between an outlet from the compression chambers and an inlet to the expansion chambers. The high side heat exchanger 36 rejects heat energy contained in the working fluid so that its temperature is reduced upon entry from the compression chambers. At constant pressure, this rejection of heat directly reduces the temperature of the working fluid. As the working fluid grows colder, its density increases and the volume occupied by each mole (micromole) is reduced proportionately. So the mass of working fluid that was introduced to the heat exchanger in a single chamber charge from the compressor volume now occupies a volume that has been reduced in proportion to the amount of heat that was rejected during its passage through the heat exchanger. If one were to remove a volume of working fluid from the exit of the heat exchanger that is equal to the volume supplied, it would reduce the pressure inside the heat exchanger, thereby reducing the temperature of the refrigerant, consequently lowering the rate of heat rejection, thereby reducing the efficiency of the system. The adjusted volume to be removed from the heat exchanger must balance both the mass being delivered by each chamber charge and the effect on its density that results from successful heat rejection as it passes through the heat exchanger.

Figure 5A:
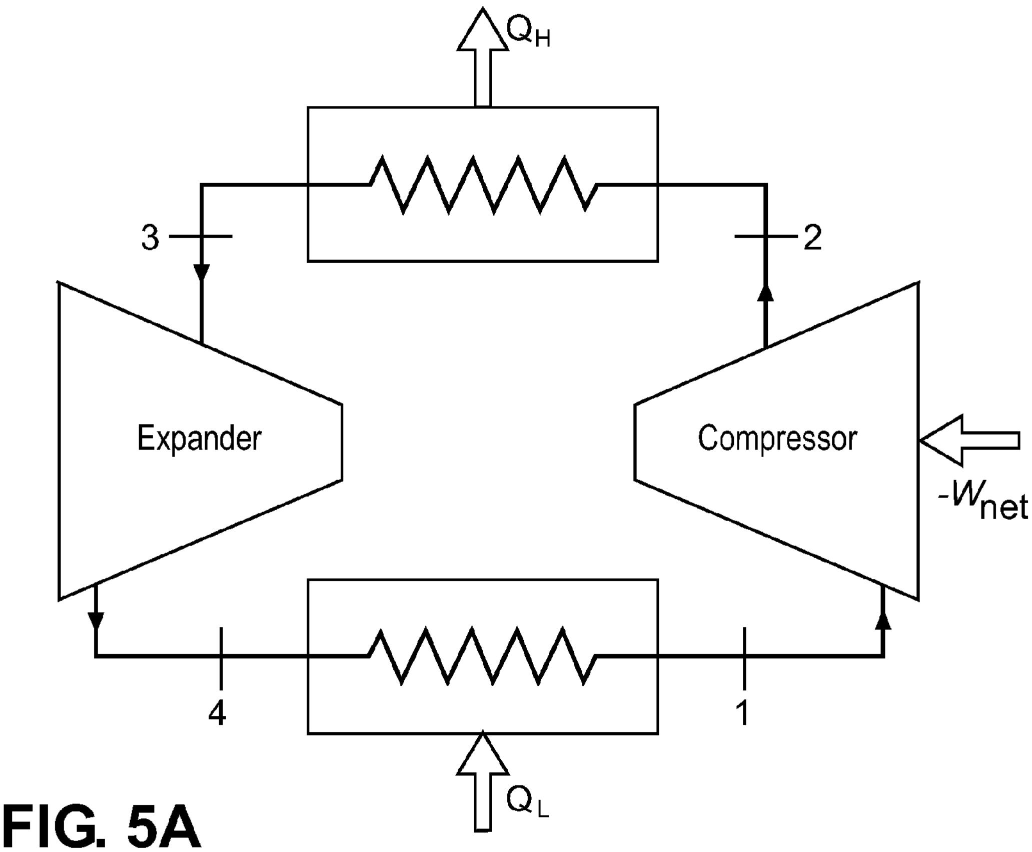
FIGS. 5A and 5B represent a gas refrigeration cycle in a turbine-based thermodynamic system.
Figure 5B:
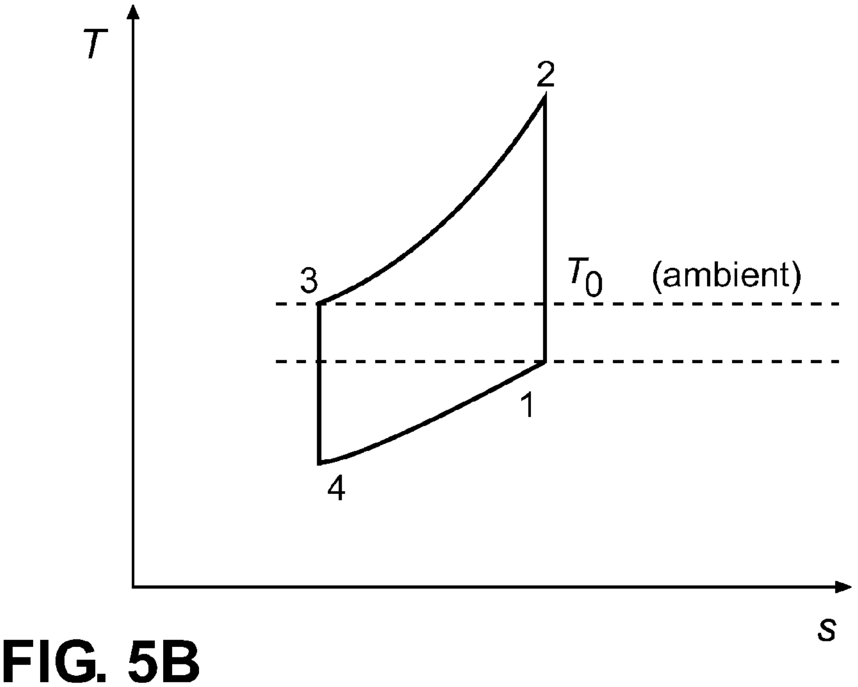

It can be shown that the volume to be removed from the heat exchanger will never equal the volume supplied in any instance where heat transfer has occurred. The following proof applies to an ideal gas operating on a Carnot cycle, although similar proofs can be developed for other thermodynamic cycles. The notation follows that of FIG. 5B. For reversible adiabatic compression one can use the ideal gas law (n is constant):

$$P_2V_2^\gamma = P_1V_1^\gamma\left(\gamma = \frac{c_P}{c_V}\right)$$

$$\Rightarrow \frac{nRV_2^\gamma T_H}{V_2} = \frac{nRV_1^\gamma T_L}{V_1}$$

$$\Rightarrow \frac{T_H}{T_L} = \frac{V_1^{\gamma-1}}{V_2^{\gamma-1}}.$$

Similarly, for a reversible adiabatic expansion process:

$$\frac{T_H}{T_L} = \frac{V_4^{\gamma-1}}{V_3^{\gamma-1}}.$$

From this follows that $$\frac{V_1^{\gamma-1}}{V_2^{\gamma-1}} = \frac{V_4^{\gamma-1}}{V_3^{\gamma-1}} \Longrightarrow \frac{V_1}{V_2} = \frac{V_4}{V_3}. \tag{1}$$

Now compare volume changes $\Delta V_{1\rightarrow 2}$ and $\Delta V_{3\rightarrow 4}$.

From (1) it is known that $$\frac{V_1}{V_2} = \frac{V_4}{V_3} = b, \tag{2}$$

where b is constant.

From (2) it follows that:

$$V_1 = bV_2 \Rightarrow \Delta V_{1\rightarrow 2} = V_1 - V_2 = V_2(b-1). \tag{3}$$

Similarly:

$$\Delta V_{3\rightarrow 4} = V_3(b-1) \tag{4}$$

Because $V_2 \neq V_3 \Rightarrow \Delta V_{1\rightarrow 2} \neq \Delta V_{3\rightarrow 4}$ Q.E.D.

Therefore, a symmetric expansion device (such as a traditional piston) is necessarily mismatched to the re-expansion of this fluid to its initial pressure. A smaller volume is determined by the amount of heat rejected in the high side exchange. This volume destabilization is mirrored on the low side as well so a smart and continuous adjustment between asymmetric compression and expansion volumes will maintain the highest efficiency (COP) as conditions change.

A low side heat exchanger 38 is also provided for the purpose of absorbing heat energy from the surroundings into the working fluid. In this example, the low side heat exchanger 38 is connected to the remainder of the device 20 through outlet and inlet valve endplates 40, 42, 44, 46. The outlet endplate 40 may be configured as either a non-rotating cover affixed to one end of the stator 24, or as a rotating member having formed therein a small, arcuate window 48. In one embodiment of this invention, a companion outlet endplate 42 is configured as a rotating member supported for rotation together with the other outlet endplate, which also rotates. The rotating outlet endplate 42 includes a window 50 formed therein which can be adjusted to variably overlap the window 48 in the endplate 40. When adjusting the position of the rotating endplate 42 relative to the other rotating endplate 40, the size and location of the two windows 48, 50 can be varied so as to control the volumetric expansion ratio developed by the device 20. The relative positions of the windows 48, 50 are intentionally adjusted to allow the exhausting working fluid to leave the device earlier or later in the rotor 26 rotation timing. The exhaust manifold 52 captures cool, expanded working fluid exiting the device 20 through the windows 48, 50. The manifold then directs this cool, low-pressure working fluid to the low side heat exchanger 38.

Low-pressure working fluid absorbs heat and exits the low side heat exchanger 38 with its volume per mole having been increased by a increase in temperature. It is returned to the compression side of the device 20 through an intake manifold 54, which is arranged to cooperate with overlapping windows 56, 58 arranged on the inlet-side endplates 44, 46 in a similar fashion. By independently controlling the amount of overlap between the respective windows 56, 58, together with their orientation relative to the stator 24 and the exhaust side endplates 40, 42, it is possible to continuously vary the ratio between volumetric compression and volumetric expansion of working fluid in the respective compressor and expander sections of the device 20, without diminishing the volumetric efficiency of compressor or expander. The net aperture created by the overlapping windows 48, 50 on the outlet side will optimally be directly, longitudinally opposed to the net aperture formed by the overlapping windows 56, 58 on the inlet side. In other words, the size and location of the outlet windows 48, 50 relative to the stator housing 24 are the same as those of the inlet windows 56, 58. Thus, when one set of windows (e.g., 48, 50) is adjusted for dimension or orientation relative to the stator housing 24, a corresponding (and simultaneous) adjustment is made with the other set of windows (56, 58). The net effect of these window adjustments is to preserve the compression chambers' volumetric efficiency by altering the displacement of the expansion chambers' volume relative to that of the compression chambers.

Figure 6A:
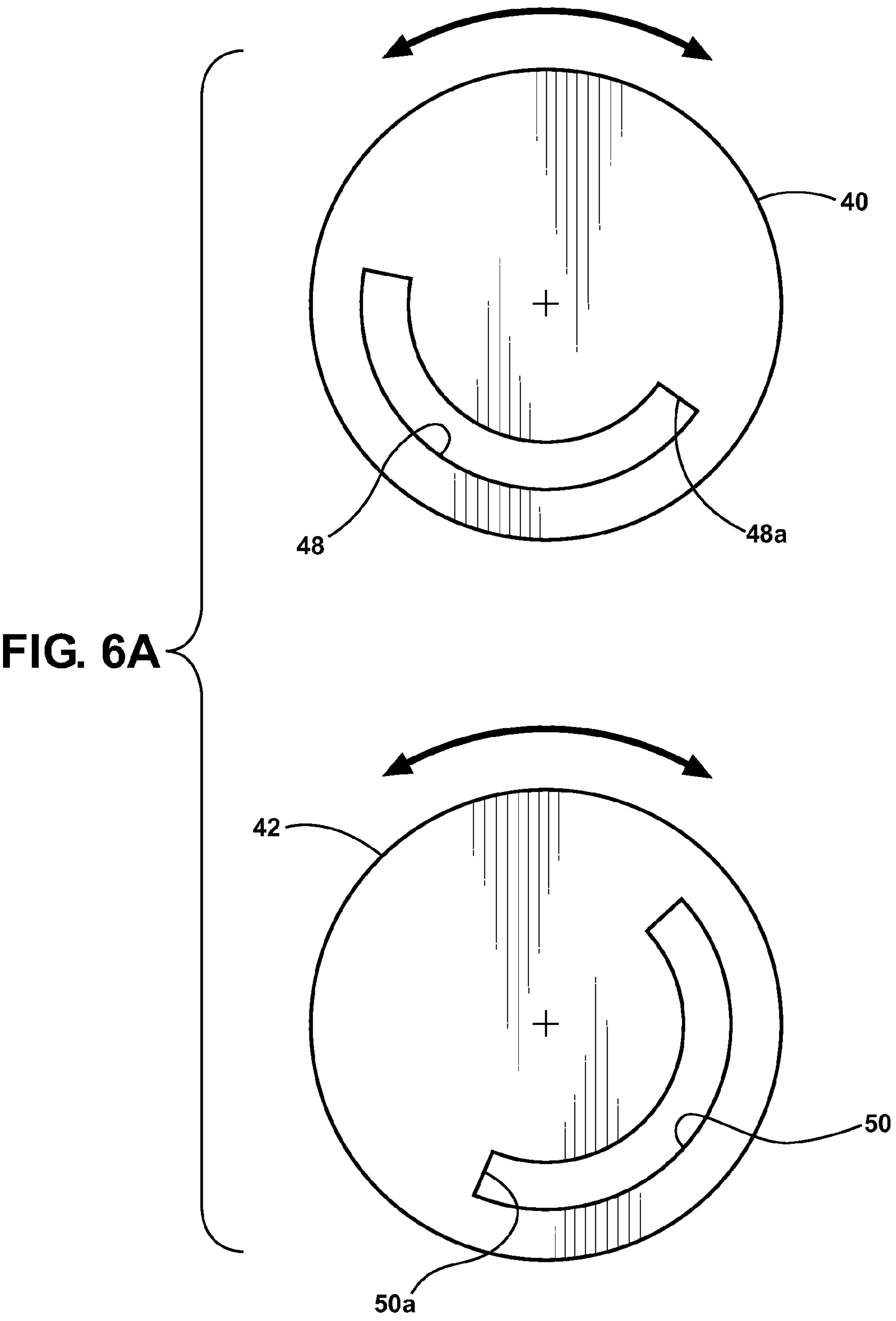
FIG. 6A shows full side elevation views of the paired exhaust side-endplates, according to the embodiment of FIG. 6.

FIG. 6A shows full side-elevation views of the paired exhaust side endplates 40, 42 in an exemplary starting location for the overlapping vent windows 48, 50. A leading edge 48*a* of the window 48 in the outermost expansion control plate 40 serves to control the cold exit pressure, volume, and temperature. The size of the resultant exhaust opening is determined by a trailing edge 50*a* in the opposing window 50 of the other endplate 42. The volumetric expansion of the working fluid is regulated by adjusting the location of the leading edge 48*a* of the window 48. Similarly, as shown in FIG. 6, a trailing edge 58*a* of the window 58 in the compression control plate 44 controls the return pressure/volume of the working fluid. The size of the resultant inlet opening is determined by a leading edge 56*a* in the opposing window 56 of the other endplate 46. By adjusting the location of the trailing edge 58*a* of the window 58, the working fluid's volumetric compression can be regulated. Adjusting the relationship between volumetric expansion and compression in this manner enables the system to exactly maximize the amount of mechanical work needed to move the target quantity of heat that the working fluid absorbs and releases. In refrigeration mode, such adjustments will minimize the work required to move the heat. In power mode, such adjustments will maximize the work extracted for the given input heat. Said another way, this method and device increases the coefficient of performance for refrigeration systems, and as will be shown below similarly increases the thermal efficiency of heat engines.

A control system may be implemented to assure the effective removal of each cool working fluid charge brought down from the high side through exit 52 and its replacement with warmer working fluid returning from the low side heat exchanger through entry 54. More generally, however, the control system monitors the amount of heat removed from the working fluid and adjusts the displacement volume of the expansion chamber(s) relative to the compression chamber(s), without decreasing the volumetric efficiency of either. Stated another way, volumetric efficiency is maintained because the mass of the working fluid delivered relative to the full swept volume of the working chamber is not substantially reduced when varying the ratio between volumetric compression and volumetric expansion. Such controls may include the use of a computer-controlled regulator system 60 that receives temperature, pressure and flow rate data from one or more sensors 62 strategically located about the device 20. The regulator 60 is effective to control drive motors 64, 66 associated with the exhaust side endplates 44, 42 and inlet endplates 44, 46, respectively. Regulator 60 may also control a metering pump 68 and the rotational speed of the device 20, managing the rate of the working fluid's flow through the system. Other control strategies are also contemplated.

As stated above, the control system compliments the step of returning the working fluid to the inlet pressure by adjusting the displacement volume of the expansion chamber relative to the compression chamber based on the amount of heat removed. In a heat transfer system, one can utilize either gas cycle or vapor cycle refrigeration. The specific heat and the amount of refrigerant (i.e., working fluid) control the heat capacity of the gas cycle systems. In vapor-compression systems the heat capacity is also affected by the latent heats of phase changes of the refrigerant. The steady state flow of heat into and out of the system is controlled by the temperature differentials at both the high pressure side and low pressure side heat exchangers. If the high pressure heat exchanger is surrounded by air at a higher temperature than the refrigerant, heat will necessarily flow into the system instead of out, and the system fails Likewise, if the low pressure side is surrounded by air at a lower temperature than the refrigerant, heat will leave the system and it will again fail. So the effectiveness of the system is determined by the relative or "approach" temperatures of external air flowing across the heat exchangers.

The quantity of heat moved into the system in process 4-1 (see, for example, FIG. 5A) is matched in relatively short order by the heat moving out of the system in process 2-3 and the work input in process 1-2. Since the first law of thermodynamics requires that $E_{in}=E_{out}$ for steady state operation, it must be that $Q_H=Q_L+W_{net}$. The rate of heat removal ($Q_L$) for a refrigerator typically does not match the heat load into the refrigerated space. Consequently, conventional refrigeration systems must be turned on and off intermittently to keep the refrigerated space at the desired set temperature.

A particular advantage of adjusting the relationship between compressor and expander volumes according to this invention is the capability to set and keep independent set point pressures (temperatures) for both the high pressure and low pressure sides. This feature is implemented though any one of the several techniques described herein, which provide alternative examples of effective control systems. For example, when the outside temperature rises, the compression ratio can be changed via the control system to raise the target temperature of the working fluid leaving the compressor. The reverse is also true. When there is more heat to be removed from the low side quicker by lowering the low side pressure, thus reducing the low side target temperature. Heat will enter the low side faster because of the increased temperature differential. The increased heat load can be dissipated more quickly on the high side by again raising the high side pressure, thus increasing the high side target temperature. Heat will leave the high side at a higher rate, thereby increasing the effective capacity of the total system.

Based on the capability to independently adjust and hold set points for high and low pressure zones, the same activity that minimizes the energy expended to move heat also maximizes the Coefficient of Performance (COP). The COP for a refrigerator is defined at $Q_l/W_{net}$. For a perfect (Carnot) refrigerator this becomes $$COP = \frac{Tlow}{Thigh - Tlow}.$$

When a well designed commercial system with fixed compression is turned on and off because its peak capacity is not required its compressor is still engineered for worst case refrigerant lift and its COP is fixed. (Commercial systems lifting refrigerant from −20 C. to +40 C. can deliver a COP no greater than 3.06) The energy efficiency of fixed compressor systems does not improve when it is turned on. The fixed compressor performance is easily contrasted to an adjustable ratio compression/expansion design like that of the subject invention whose benefits carry over directly from air conditioning to operation as a heat pump. When needed, a device constructed according to the principles of this invention can deliver comparable capacity as the less efficient fixed compression systems in place today but much more efficiently. The proposed system can be configured, e.g., via the control system and regulator 60, to automatically increase its own COP as the needed refrigerant lift target temperatures get closer together.

Figure 7:
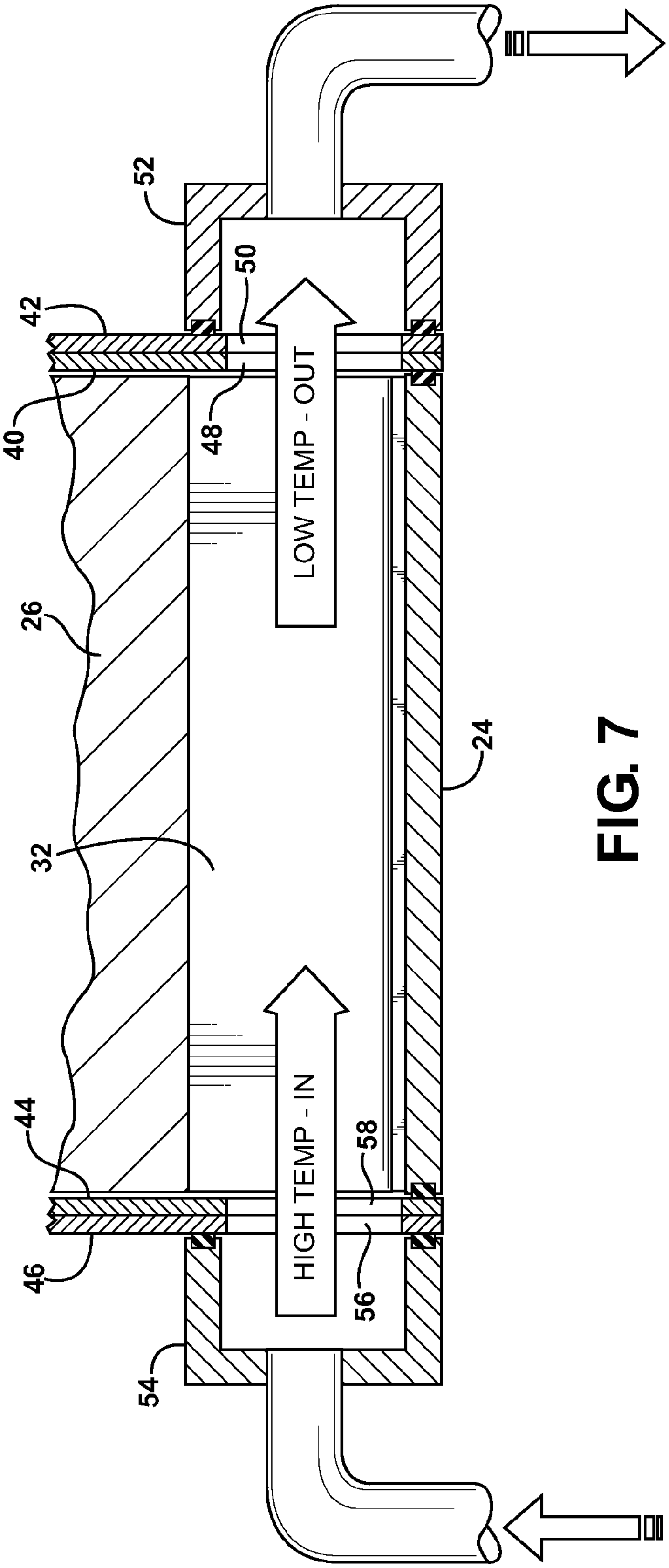
FIG. 7 is a fragmentary view of the device as shown in FIG. 6, and illustrating a section through the compressor inlet and expander outlet which includes a pair of rotating valve plates having apertures formed therein for conducting the passage of a working fluid so as to manage the thermodynamic efficiency of the device under varying conditions.

FIG. 7 is an enlarged, simplified view through the exhaust 52 and intake 54 manifolds depicting the exchange of working fluid. Of course, many other techniques and constructions may be employed in a positive displacement fluid-handling device 20 and configured so as to continuously vary the ratio between the volumetric compression and volumetric expansion while recovering all of the mechanical energy invested into the working fluid, save frictional and/or heat losses consistent with the second law of thermodynamics.

Figure 8:
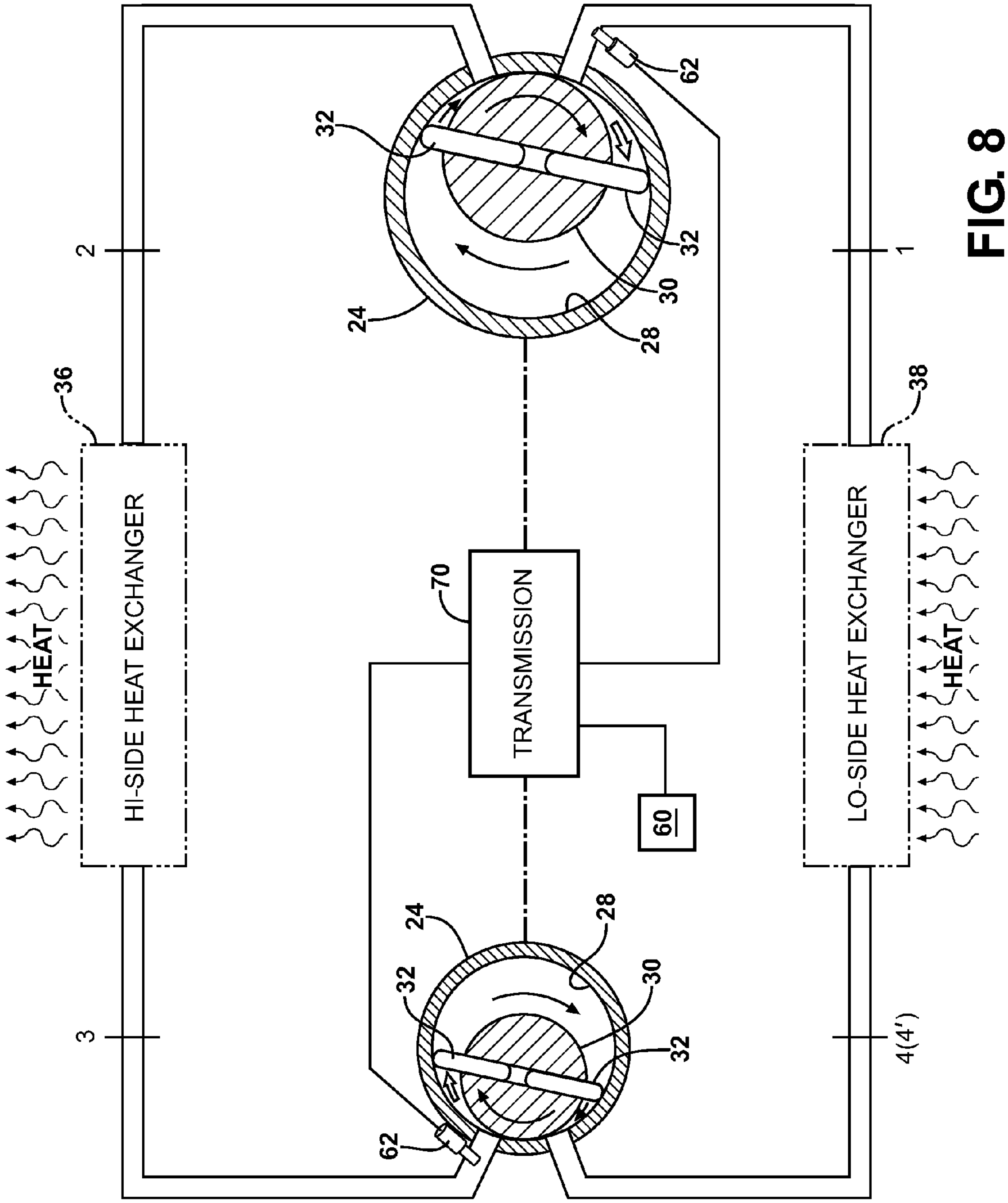
FIG. 8 is a highly simplified view showing a thermodynamic, closed-loop system in which two rotary devices, of different scales, operate in concert through an intervening transmission to provide a continuously varying ratio between volumetric compression and volumetric expansion of the working fluid.

FIG. 8 describes a further application of this invention wherein a pair of positive displacement rotary-type devices may be operatively coupled to a transmission 70 which is configured to continuously vary the ratio between the volumetric compression and volumetric expansion of the working fluid in the respective compressor and expander sections without diminishing the volumetric efficiency of either the compressor or the expander. In this highly simplified example, the transmission 70 augments the regulator 60 in the embodiment shown in FIG. 6, and compression and expansion operations are carried out in physically separated rotary devices which, in the context of the overall thermodynamic system, are components in the system as shown. Here, the transmission 70 may control the rotational speeds of the respective compressor and/or expander sections, together with varying inlet and exhaust specifications using the end-plate features described above in connection with FIG. 6. The scale of the expansion-side rotary device may be different than the compressor-side device to facilitate non-symmetrical compression/expansion ratios.

FIG. 8 is illustrative also of the fact that the working fluid can be circulated in either direction through the system to provide either refrigeration or heat pump functionality. In this view, arrows point upward (as Q) showing heat being rejected out of the high pressure-temperature heat exchanger 36 and absorbed in the lower pressure-temperature heat exchanger 38. The state point numbers (1 through 4') correspond to the state points shown in FIG. 5A. The stage or cycle numbering (1-4') is that of a refrigeration system. The compression of the working fluid from cold to hot is accomplished in the larger volume rotary device. In FIG. 8 this means that the larger device on the right hand side shows both fluid flow and heat going from bottom to top in the counter-clockwise direction. This will be exactly the same fluid flow when describing a heat pump as well. Heat enters into the low-pressure heat exchanger in both cases. In air conditioning (summer) mode, the low pressure-temperature heat exchanger 38 is located in or near the space to be cooled. When one operates this same device as a heat pump, the low-pressure side is situated where there is available heat to be extracted and brought into a desired space associated with the high pressure-temperature exchanger 36. In both air conditioner and heat pump applications, the direction of heat flow and fluid flow always remains from low (temperature-pressure) to high (temperature-pressure), and the compressor volume typically remains larger on a going basis than the expander volume. In a fixed installation such as a home, the interior heat exchanger may be employed for both cooling and heating. For example, the inside heat exchanger ("A-coil" in a forced air furnace configuration) would be the LO-Side heat exchanger in the summer. After "re-plumbing" for winter operation, the A-coil would take its place as the HI-Side heat exchanger for heat pump operation in the winter. The fluid flows through the compressor and expander would remain the same. For a heat engine, of course, everything is reversed, including the relative size of the compressor and expander. As before it can be stressed that continual adjustment of the relationship between compression and expansion provides for independent adjustment of pressure targets resulting in the maximum benefit with a minimum of energy expended.

Figure 8A:
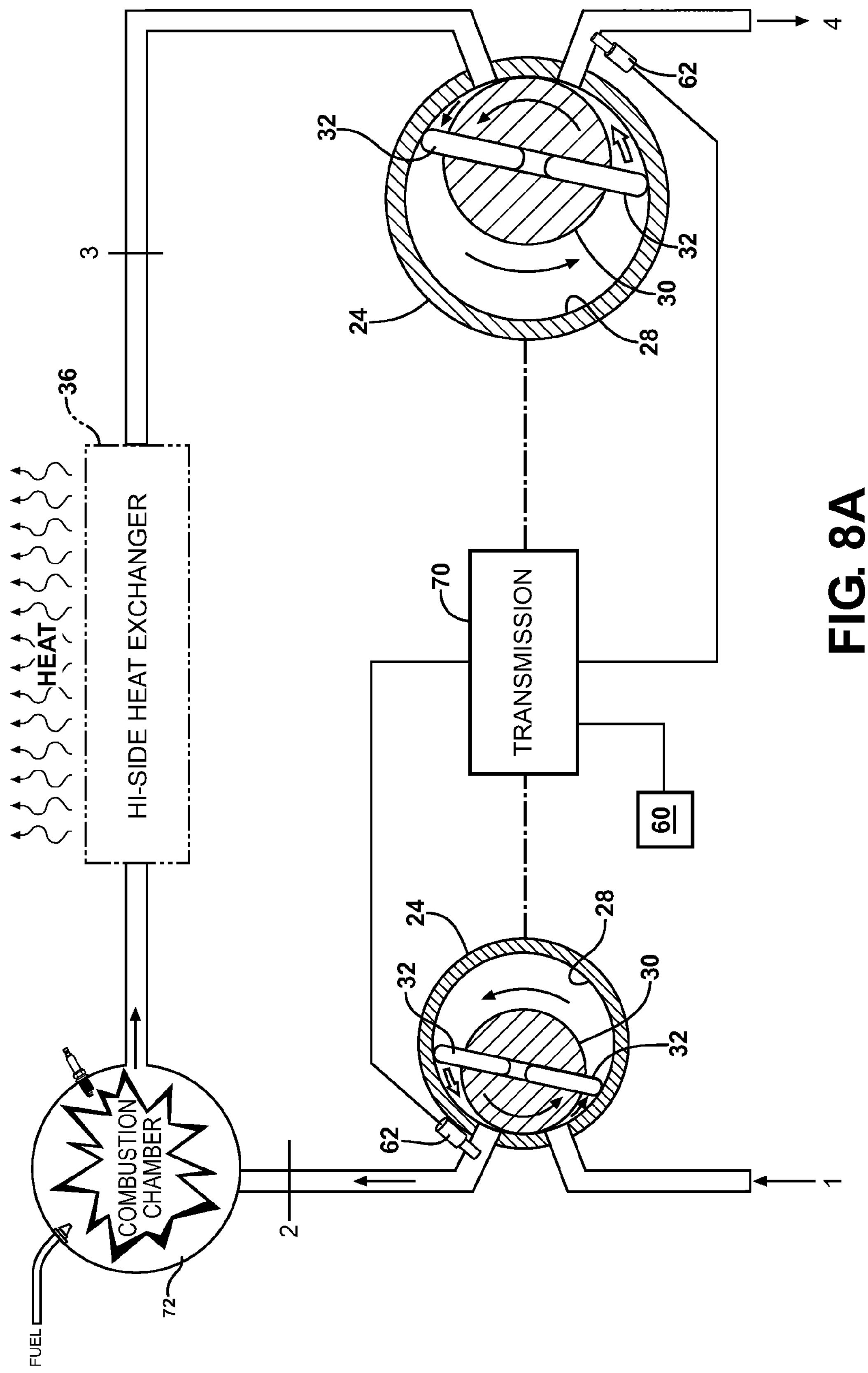
FIG. 8A is a view as in FIG. 8, but in which the refrigeration loop is open to use atmospheric air as the low side heat exchanger and an auxiliary burner can be selectively activated to provide both power and heat.

FIG. 8A shows a case where one of the heat exchangers (the "outside" heat exchanger) presented in FIG. 8 is bypassed or omitted. The system uses atmospheric air as the refrigerant. For air conditioning purposes the smaller volume device will again feed the heat exchanger (e.g., furnace A-coil), and the fluid flow in this configuration is clockwise. There is no outside heat exchanger per se and the compressor does not have to raise the temperature of air leaving the heat exchanger to the same high temperature that would be required to reject heat in an outside heat exchanger. By inspection one can readily conclude that the COP is much higher than could be obtained in a re-circulating refrigerant system because the exit temperature does not have to be raised at all. Once exit air pressure is returned to atmospheric level, it can be released as exhaust. As before it can be stressed that continual adjustment of the relationship between compression and expansion provides for independent adjustment of pressure targets resulting in the maximum benefit with a minimum of energy expended.

FIG. 8A also shows all devices and plumbing in the right position to provide heat by simply reversing the flow of air refrigerant through the fixed system as installed. In this case the larger volume device heats outside air by compression. Heat is released in the heat exchanger (e.g., A-coil) and its density increases such that the smaller volume device may extract available work as it expands to atmospheric pressure on the way out. The devices may be advantageously powered by electricity as in any conventional heat pump situation. It can be shown that a heat pump is significantly more effective in producing heat from electricity than a tungsten element space heater. For a resistive heating element the COP ($Q_{out}/W_{in}$) is 1, whereas for an a heat pump the COP can be easily within the range of 3-4. COP's in much higher ranges may be expected by the methods of this invention wherein continual adjustment of the relationship between compression and expansion provides for independent adjustment of pressure targets resulting in the maximum benefit with a minimum of energy expended.

FIG. 8A also shows a burner introduced into the same plumbing that otherwise already supports a heat pump/air-conditioner. One of the complaints against the use of heat pumps in colder climates is that they are inadequate in colder weather and that a furnace is required in any case. Hybrid heat pumps integrated with high efficiency furnaces are available although their purchase cost is high enough to discourage widespread adoption at the current relatively favorable natural gas and electricity prices. Taking note of the fact that the heat pump/air-conditioner configuration already provides a compressor and expander, a burner may be introduced between them. In this position an auxiliary furnace transforms the hybrid heat pump configuration into a heat engine. The output of a high efficiency furnace may be dramatically increased while at the same time powering an auxiliary generator, for example. Continual adjustment of the relationship between compression and expansion provides for independent adjustment of pressure targets resulting in the maximum benefit with a minimum of energy expended.

Figure 9:
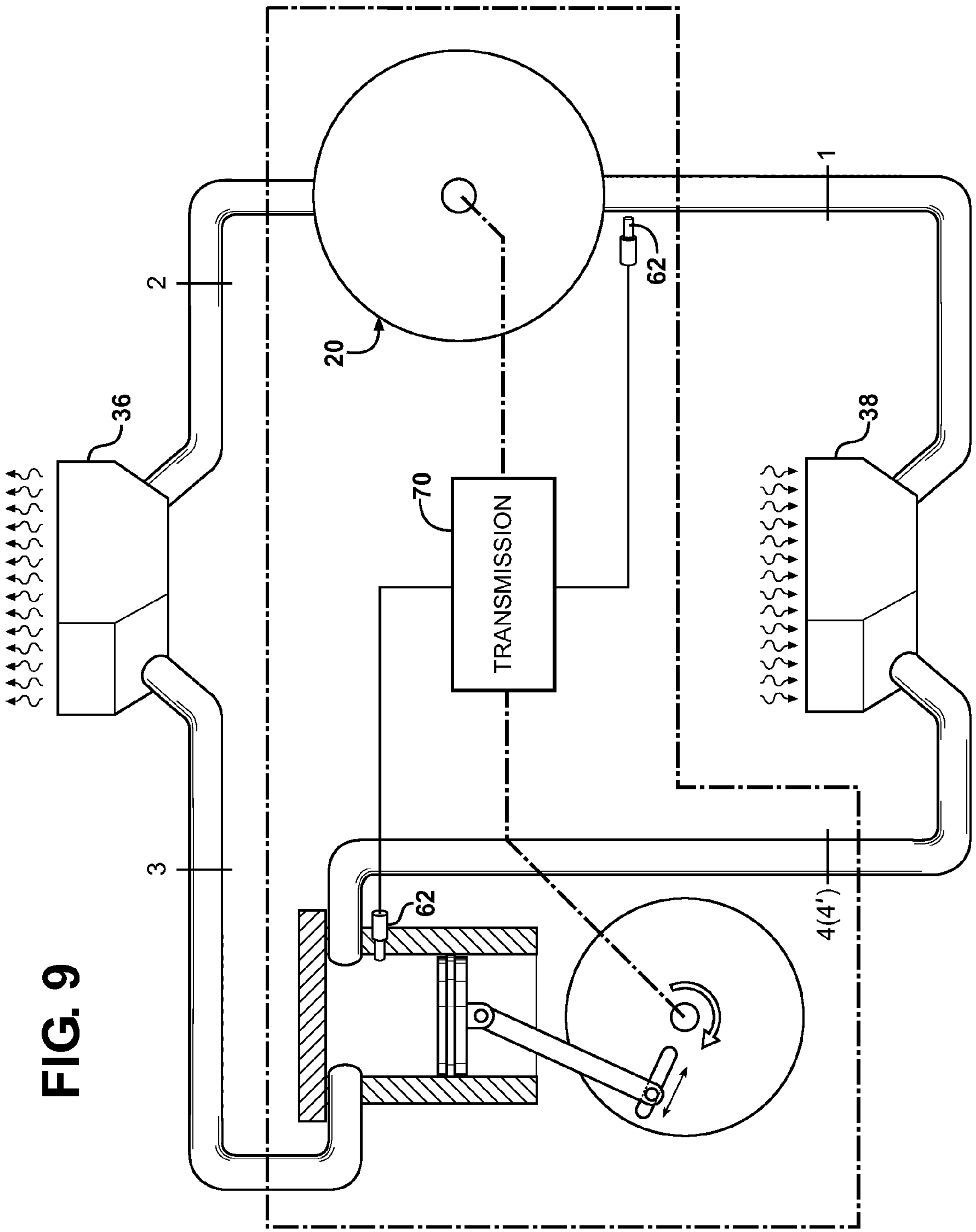
FIG. 9 describes yet another variation of this invention, wherein a positive displacement device includes a piston/cylinder compressor coupled to a rotary expander through an intervening transmission.

FIG. 9 shows yet another variation of the concept described in FIG. 8, with a reciprocating piston and cylinder arrangement, rather than a rotary device, providing the compressor function. The variability in the volumetric compression ratio may be accomplished in any suitable fashion, and is here shown for illustrative purposes being accomplished through a variable mechanism in which piston stroke length can be altered on the fly. As a result, the embodiment shown in FIG. 9 is equally capable of continuously varying the ratio between the volumetric compression and volumetric expansion of the working fluid in the respective compressor and expander sections without diminishing the volumetric efficiency of either the compressor or the expander. Furthermore, a device of this nature, when operated through the transmission 70, is highly efficient to operate because all of the mechanical energy invested into the working fluid can be recovered, save frictional and/or heat losses.

Figure 10:
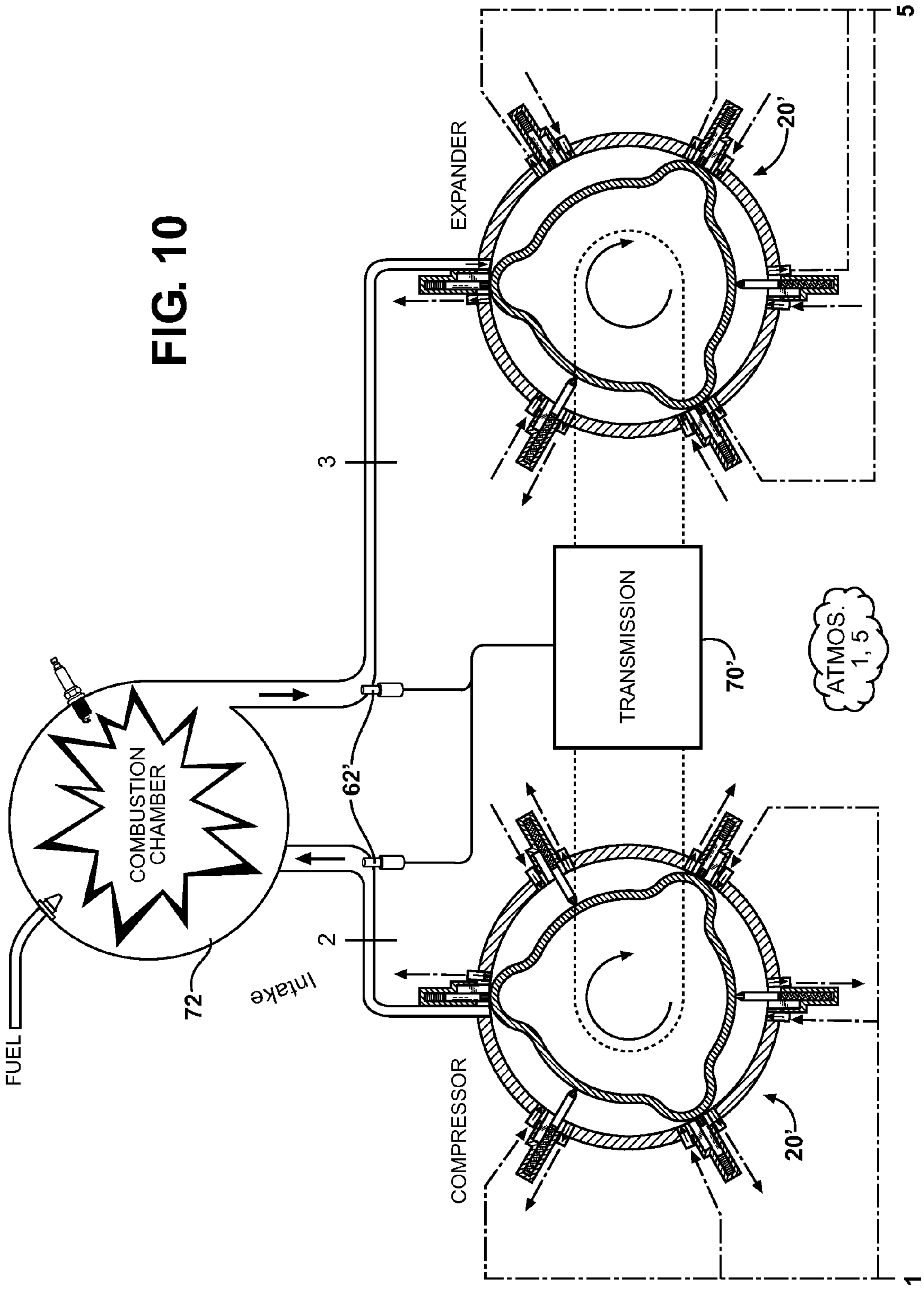
FIG. 10 presents a combustion engine arrangement wherein distinct compressor and expander sections are operatively controlled through a transmission, with combustion occurring in a remote combustion chamber.

Turning now to FIG. 10, in this example of the invention as applied within the context of combustion processes, a pair of rotary devices 20' are arranged so that one device 20' functions as a compressor whereas the other device 20' operates as an expander. Furthermore, the rotary devices 20' here illustrated are substantially similar to those described in applicant's International Publication No. WO 2007/035670, the entire disclosure of which is hereby incorporated by reference. The rotary devices 20' are connected through a transmission 70' and respectively controlled so as to recover all of the mechanical energy invested into the working fluid, save frictional and/or heat losses. Furthermore, the expander section is capable of expanding the working fluid sufficiently so that all of the mechanical energy in the working fluid is captured by the device 20' prior to being released to atmosphere. The drawing shows that vanes may be held retracted in the expander rotor in order to independently alter the expansion ratio significantly and suddenly. Naturally, although not shown, vanes may be held retracted in the compressor rotor with similar effect. There may be many vanes between adjacent lobes. In an engine this may be desirable to address an unexpected demand for acceleration or braking. A combustion chamber 72 is disposed between the compressor and expander sections, in this example, and serves to create additional mechanical energy in the working fluid by combusting fuel contained therein. As a result, the device configured according to FIG. 10 functions as an engine and is highly efficient because the ratio between the volumetric compression and expansion is continuously varied by the transmission 70' without diminishing the volumetric efficiency of either the compressor or the expander. This example further serves to illustrate that any combination of devices can be used to precisely match the volume compressed to the variable volume being expanded (or vice-versa) in each time period thereby maximizing the amount of power extracted from the working fluid regardless of the combustion calibration chosen for economy, to minimize noxious byproducts of combustion, or to deliver a sudden burst of acceleration. They may be cascaded or ganged to produce arbitrarily higher pressures as in a linear flow compressor where the differential pressure between stages may be small but a cascade of many stages results in higher pressures than the metals at any single stage could withstand alone.

Figure 11:
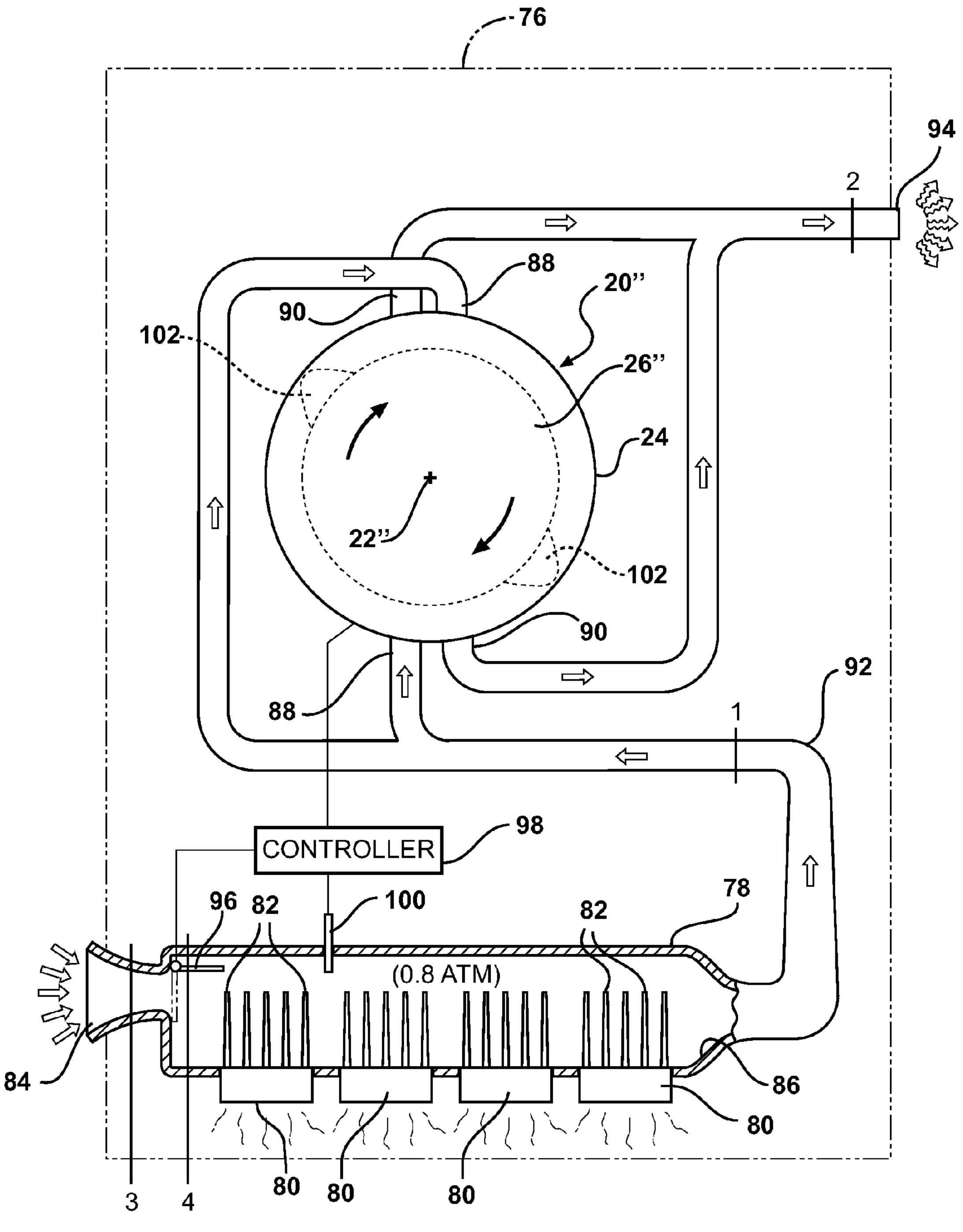
FIG. 11 is a schematic view of another variation of the subject invention applied in the context of air cycle refrigeration, including a two-lobed rotary compressor/expander device.

FIG. 11 illustrates yet another application of the subject invention configured in an open loop air-cycle refrigeration arrangement. In this example, the broken peripheral line represents a computer processor cabinet 76 as but one exemplary application for a positive displacement fluid-handling device 20" according to this invention. In this open loop dynamic fluid system, a chilling chamber 78 is disposed within the computer processor cabinet 76. At least one hot object is placed in thermal contact with the chilling chamber 78. In this example, the hot object is depicted as a plurality of heat-generating electrical components 80 such as printed circuit boards, CPUs and other devices required to be cooled. These heat-generating electrical components 80 are held in relation to the chilling chamber 78 so that they are thermally affected by the general ambient air within the cabinet 76. The electrical components 80 may be placed in thermal contact with heat-exchanging elements 82, such as cooling fins, which are disposed within the chilling chamber 78. Thus, heat generated by the electrical components 80 is conducted to the heat exchanging elements 82, in heat-sink fashion, where convective cooling may take place.

It is well settled that computer processing speeds can be substantially increased by the proper management of heat generated by its electrical components 80. The chilling chamber 78 is configured so that it has an air intake opening 84 and an air exit 86. The positive displacement fluid-handling device 20" according to one embodiment of this invention is used to draw air at a second pressure, such as ambient or 1.0 ATM, and an ambient temperature from outside the chilling chamber 78 through an air intake 84. As air is drawn through the air intake 84, it is rapidly expanded through an appropriate restrictor device or sonic nozzle such that an abrupt pressure drop occurs reducing the temperature of air contained with the chilling chamber 78 to a first pressure that is lower than the ambient second pressure. A corresponding temperature drop in the air inside the chilling chamber 78 takes effect in compliance with the well known Ideal Gas Law (PV=nRT). It will be appreciated that a drop in air temperature, however modest, increases the rate of heat removal from the heat-generating electrical components 80, thus allowing increases in processor speed and other benefits gained by removing heat from hot objects 80 in thermal communication with the chilling chamber 78.

In the simplified example of FIG. 11, the positive displacement fluid-handling device 20" is shown including two inlets 88, one at its top and the other at its bottom. Likewise, two outlets 90 are shown. An appropriate conduit 92 is shown connecting the air exit 86 from the chilling chamber 78 to the pump inlets 88. This illustration introduces the general concept of increasing numbers of chambers by replicating lobes and vanes around the circumference of the rotor, a concept which is more fully developed in International Publication No. WO 2007/035670. In this manner, the device 20" is used to draw air through the air intake 84 to achieve the desired air-cycle refrigeration. Although not shown, it will be appreciated that an electric motor or other work-input device must be connected to the device 20" so as to rotate its rotor 26" and move the compressible working fluid in the manner thus described. Warm air exits the device 20" at each outlet 90 and is routed, ultimately, to a vent 94. Preferably, although by no means necessarily, the air intake 84 and the vent 94 are located on different sides of the cabinet 76, and in an ideal configuration as remote from one another as possible. This reduces the tendency of warm discharged air being drawn into the air intake 84 prior to returning to ambient atmospheric temperature.

In order to maintain the requisite pressure drop inside the chilling chamber 78, and thus to achieve the desired cooling effects in the gas temperature, it is necessary to control the flow of air through the intake 84 so as to continually maintain the lower first pressure therein. As previously indicated by FIG. 6 and later by FIG. 17, this can be accomplished in various ways and is shown in a highly simplified manner in FIG. 11 with the use of a valve 96 that can be throttled between open and closed positions. Preferably such a valve 96 is at least spring-loaded, but otherwise it is automatically configured after the fashion of a relief valve to contain the advantageous pressure differential inside the chilling chamber 78.

The valve 96 can also be motorized in such a fashion that its position can be intentionally controlled. For example, a controller 98 may be used to throttle the valve 96 and achieve greater or lesser degrees of pressure drop as air passes through the intake 84. This can be done to achieve different cooling effects. Along these lines, it may be desirable to place a temperature sensor 100 inside the chilling chamber 78 providing feedback signals to the controller 98. If the temperature inside the chilling chamber 78 is too high, the valve 96 can be adjusted to increase the pressure drop and result in a corresponding temperature drop. Conversely, if the temperature inside the chilling chamber 78 is too low, the controller 98 can signal the valve 96 to adjust its position in an appropriate fashion, thereby decreasing the pressure drop through the air intake 84 and resulting in a temperature increase inside the chilling chamber 78. To further enhance control functionality, the controller 98 may be connected to a motor or other variable speed input device associated with the pump assembly 20", such that adjustments in the movement of air through the intake 84 can be accomplished by varying the displacement speed of the rotary device 20". Such variations in the rotational speed of the device 20" can be done in tandem with or independently of adjustments made to the valve 96, all with the intent of controlling the flow of air through the air intake so as to continuously achieve or maintain an optimal first pressure within the chilling chamber 78. As before it can be stressed that continual adjustment of the relationship between compression and expansion provides for independent adjustment of pressure targets resulting in the maximum benefit with a minimum of energy expended.

Figure 12:
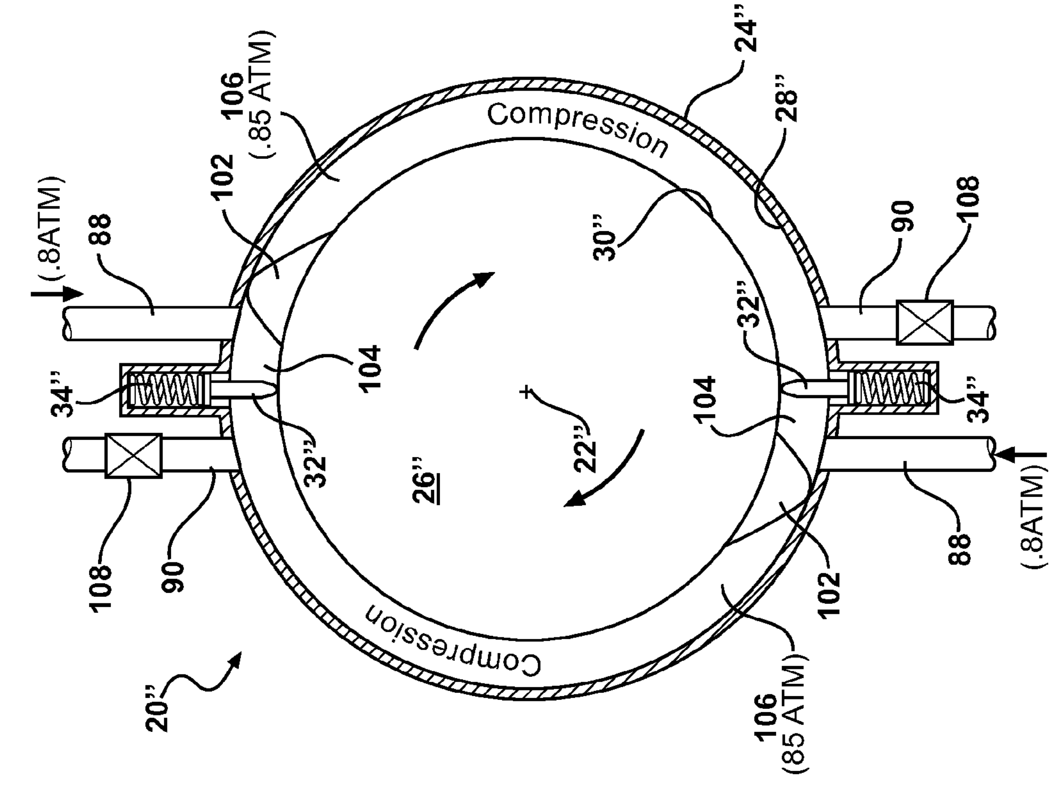

FIG. 12 is a highly simplified schematic representation of the device 20", shown for the purpose of describing the particularly advantageous, high-efficiency aspects of this invention. As mentioned above, this multiple-chamber version is detailed only to illustrate one way in which a single rotor may include multiple active chambers and functions, intermittently serving as compression and expansion chambers. For FIGS. 11-16, the left side and its operation are duplicated exactly in the right side such that a single rotation (360 degrees) completes two full cycles. More specifically, the device 20" is shown having an internal rotor 26" and an external stator 24", substantially similar to that described in preceding examples. The rotor 26" includes two opposed sweeping elements in the form of lobes 102. The lobes 102 on the examples function as a type of "fixed vane," although different in structure and function than the companion extractable vanes 32". Although not shown, the lobes 102 will include pressure seals at their peak or crest, which engages the inner wall 28" of the stator 24", thereby establishing a generally gas-tight seal. In this example, four chambers are formed inside the device 20". There are two diametrically opposed expansion chambers 104 and two diametrically opposed compression chambers 106 in this example. Considering a clockwise rotation of the rotor 26" as viewed from FIG. 13, the expansion chambers 104 are bounded by the trailing side of each lobe 102 and one vane 32". Conversely, the compression chambers 106 are bounded on the leading face of each lobe 102 and a next successive vane 32". An inlet 88, for receiving working fluid into the expansion chamber 104, and a first pressure is shown. Air entering the inlet 88 will be maintained at or about 0.8 ATM, which is merely an exemplary differentiated pressure chosen for convenience of illustration. Thus, air at the lower differentiated pressure communicates directly to each expansion chamber 104 via the respective inlets 88.

The outlets 90 are provided for discharging working fluid from respective compression chambers 106 to the thermodynamic system at the higher inlet pressure which, in this example, is ambient pressure, or 1.0 ATM. Preferably, a normally closed relief valve 108 is operatively associated with each outlet 90 for automatically opening to allow working fluid flow to the system in response to the pressure within the compression chambers 106 having reached the inlet pressure. In other words, the relief valves 108 are set to remain closed until such time as pressure within the compression chambers 106 reaches the second pressure.

This is the secret to assured volumetric efficiency in the design. Normally open ports (88) remain open with a pressure differential of zero at all times and are engineered for flow rates matching the highest operating speed. Normally closed ports (108) pass gas when the pressure differential reaches zero and then at the same rate as normally open ports. As shown by reference to the successive views of FIGS. 13, 14, 15 and 16, each lobe 102 is forcibly stroked or swept in the direction over a distance to simultaneously constrict the volume of the compression chambers 106 while expanding the volume of the expansion chambers 104. In one embodiment of this invention, this forcible sweeping causes the lobes 102 to travel in an arcuate direction. In other embodiments, including alternative embodiments shown and contemplated, this sweeping step may be carried out by moving pistons in a linear direction or other sweeping patterns. Those of skill in the art may appreciate other sweeping motions as well and the shapes of lobes, chamber height and width may be optimized for any target task.

Figure 16:
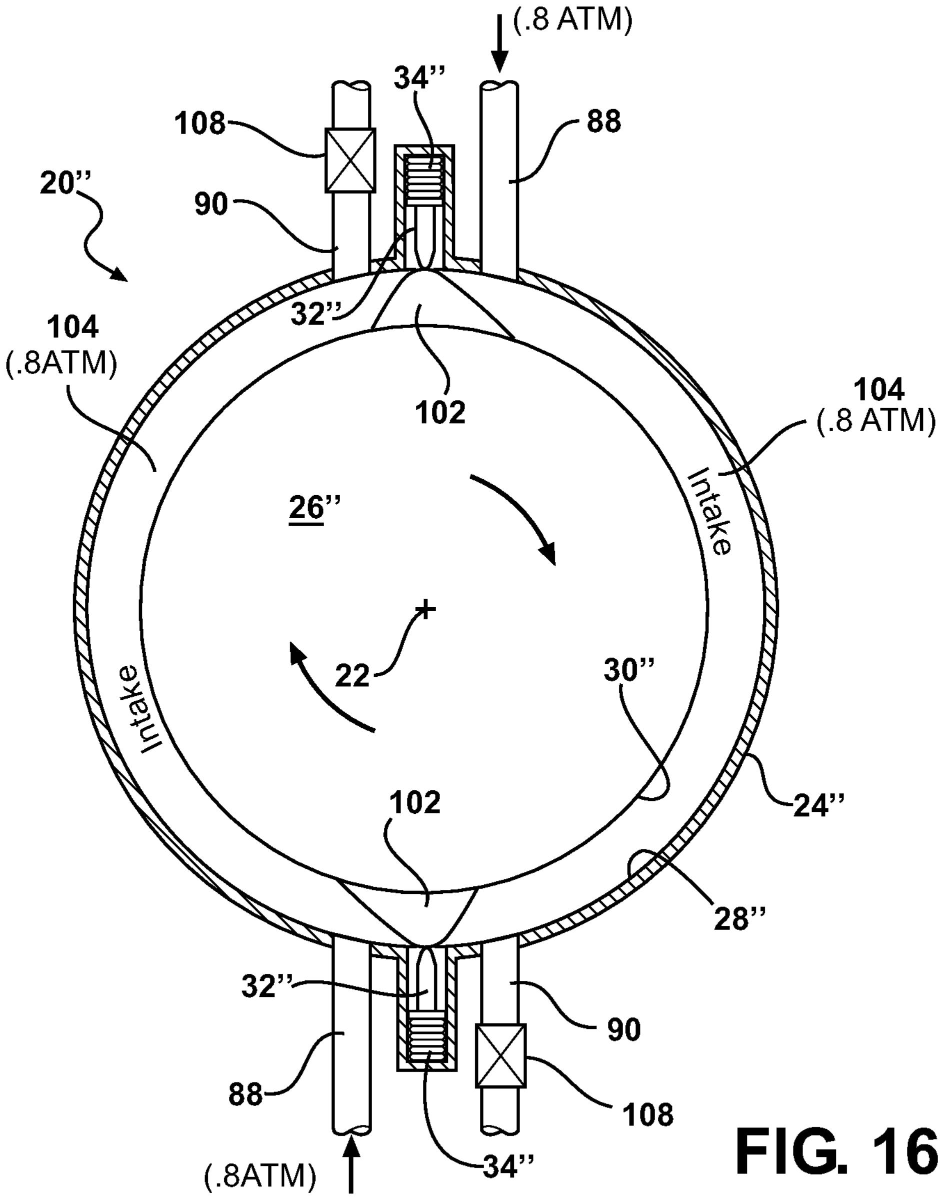

At the very beginning of each sweep of the lobes 102, most suitably illustrated in FIG. 16, the working fluid pressures on the leading and trailing sides of the lobes 102 are balanced. This is due to the closing of the relief valve 108 as the lobe 102 completes its compression stroke and moves past the immediately adjacent vane 32", thus trapping working fluid at the differentiated pressure on both sides of the lobes 102. Returning to FIG. 12, as the lobes begin movement through their respective strokes, the trailing sides of each lobe 102 remains exposed to the lower differentiated pressure working fluid in the respective expansion chambers 104. The pressures in the compression chambers 106 slowly increase as the volume in the compression chambers 106 is constricted by the sweeping movement of the lobes 102. Thus, in FIG. 12, the pressure in the compression chambers 106 is suggested to be approximately 0.85 ATM. These suggested numbers are merely for description purposes, and not in any way intended to be limiting embodiments of this invention.

Figure 13:
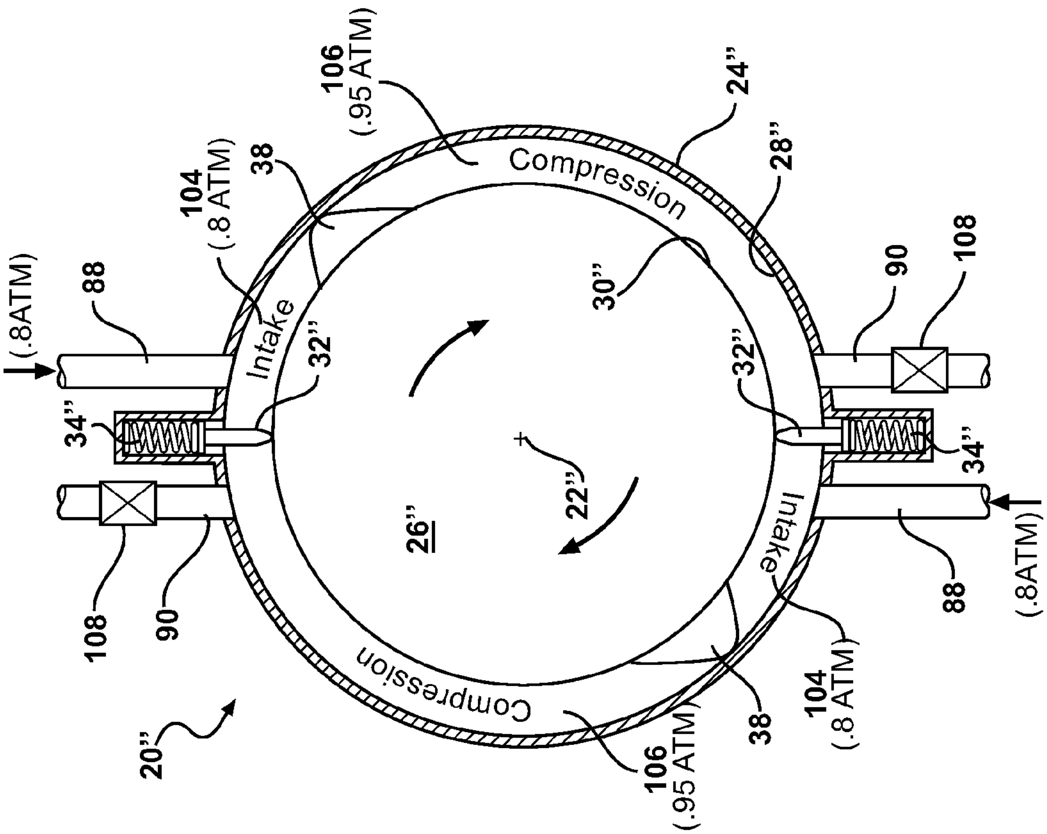
FIGS. 12-16 are highly illustrative, sequential views of the positive displacement device of FIG. 11, wherein an internal rotor is incrementally rotated through approximately 170 degrees of operation.

In FIG. 13, where incremental progression of the rotor 26" results in further displacement of the lobes 102, the pressure in each compression chamber 106 has risen to a suggested 0.95 ATM. Still, the relief valves 108 remain closed, as being set to activate only upon the attainment of a pressure equal to the inlet pressure inside the compression chamber 106 (which in this example is 1.0 ATM). At all times, the pressure in the expansion chambers 104 remains nominally equal to the differentiated pressure which has been deemed 0.8 ATM for discussion purposes.

Figure 14:
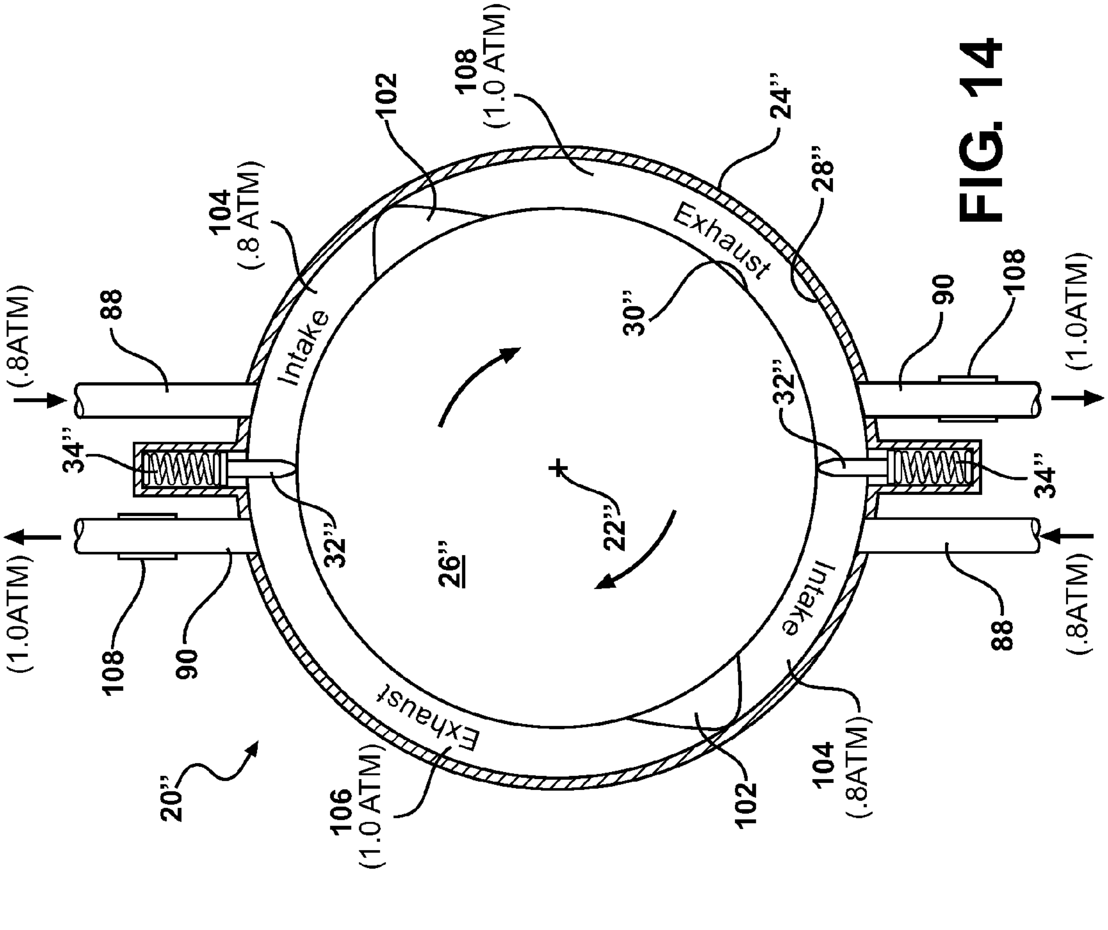

FIG. 14 shows a still further progression in the cycle wherein the rotor 26" is advanced in the clockwise direction, thus further displacing the lobes 102 resulting in pressure increases in the compression chambers 106 which achieve parity with the inlet pressure of 1.0 ATM. Upon this occurrence, the relief valves 108 open, permitting the discharge of compressed working fluid through the respective outlets 90. Still, at all times, the pressure in the expansion chambers 104 remains equal to the differentiated pressure of 0.8 ATM.

Figure 15:
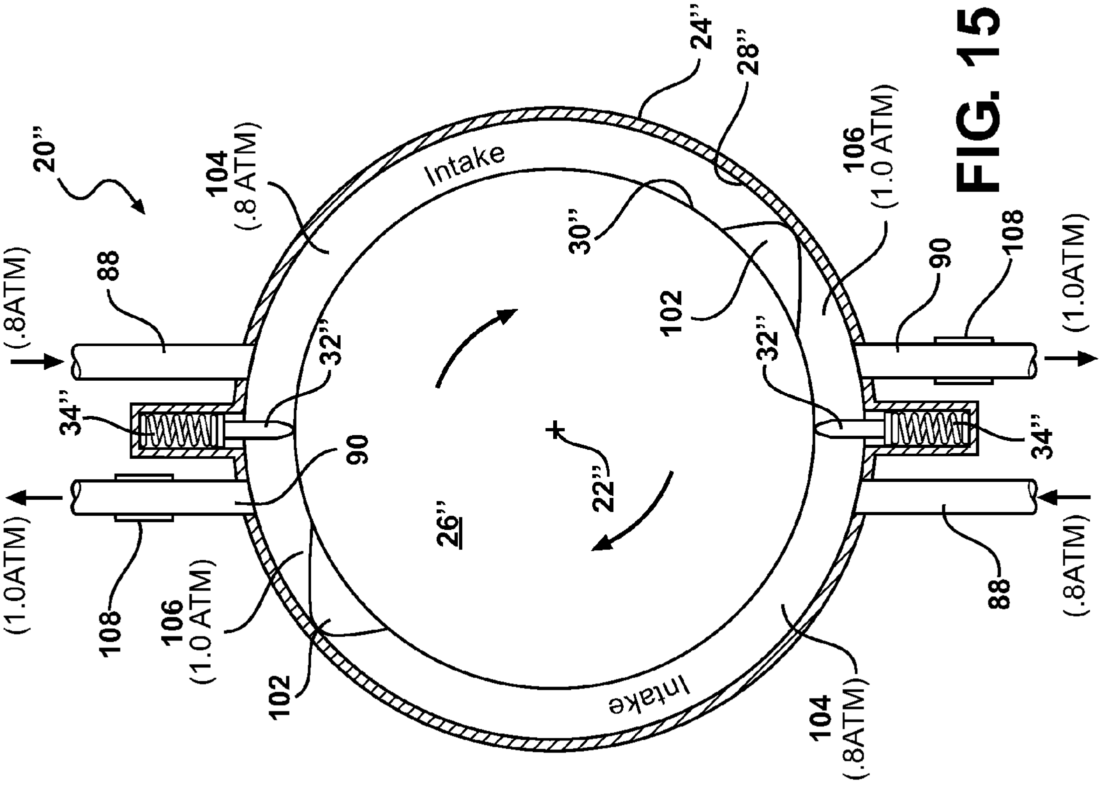

FIG. 15 shows continued rotation wherein the lobes 102 have almost completed their stroking distance and continue to expel working fluid from the compression chambers 106 at the inlet pressure. Still, gas introduced to the expansion chambers 104 remains at the differentiated pressure.

FIG. 16 depicts full completion of the stroke wherein the cam-like surfaces of the lobes 102 displace the vanes 32" and the relief valves 108 automatically close when exposed to gas pressures at the lower differentiated pressure (0.8 ATM). At this moment, pressures on either side of the lobes 102 are balanced at 0.8 ATM. Continued rotation of the rotor 26" returns the assembly to the condition shown in FIG. 12 to repeat the cycle.

It will be appreciated that the step of sweeping the lobes 102 imparts mechanical energy to the working fluid that is maintained at the differentiated pressure. This mechanical energy resides in the form of a pressure differential relative to the inlet pressure. Thus, in this example, the working fluid contained in the system upstream of the inlet 88 is maintained at the lower differentiated pressure. The compressible nature of the working fluid inherently stores this mechanical energy which is then directly applied, at least in part, to the lobes 102 as they constrict the volume of the compression chambers 106 in the manner described above. In other words, because each lobe 102 begins its stroke in equilibrium, i.e., equal gas pressures on trailing and leading sides, there is no initial work required to compress the working fluid, other than ordinary friction losses. With only a small degree of rotation, however, the equilibrium quickly becomes imbalanced and the amount of work required to compress the working fluid in the compression chambers 106 increases to a peak or plateau coincident with the opening of the relief valves 108. In other words, the amount of work required to compress the working fluid in the compression chambers 106 begins at 0 at the start of the stroking distance, and then steadily increases to an maximum value when the relief valves 108 open and the gas pressure inside the compression chambers 106 is maintained at the inlet pressure until completion of the sweeping movements. Thus, by directly applying mechanical energy from the working fluid at the differentiated pressure, a transitory supplemental force is recovered which acts on the lobes 102 in a direction harmonious with the direction of its forcible sweeping path. The mechanical energy which is then preserved, or recovered, from the working fluid is applied so as to offset the work required to compress working fluid in the compression chambers 106. While the mechanical energy recovered in this manner may be modest, its effect is beneficial and effective to reduce the overall energy consumption required to operate the subject device 20". Said another way, the work energy input that is required to be applied to the lobes 102 to constrict the volume of the compression chambers 106 is directly and proportionally reduced by the application of mechanical energy from the working fluid at the differentiated pressure onto the lobes 102 such that the overall energy consumption needed to operate the device 20" is reduced.

Figure 17:
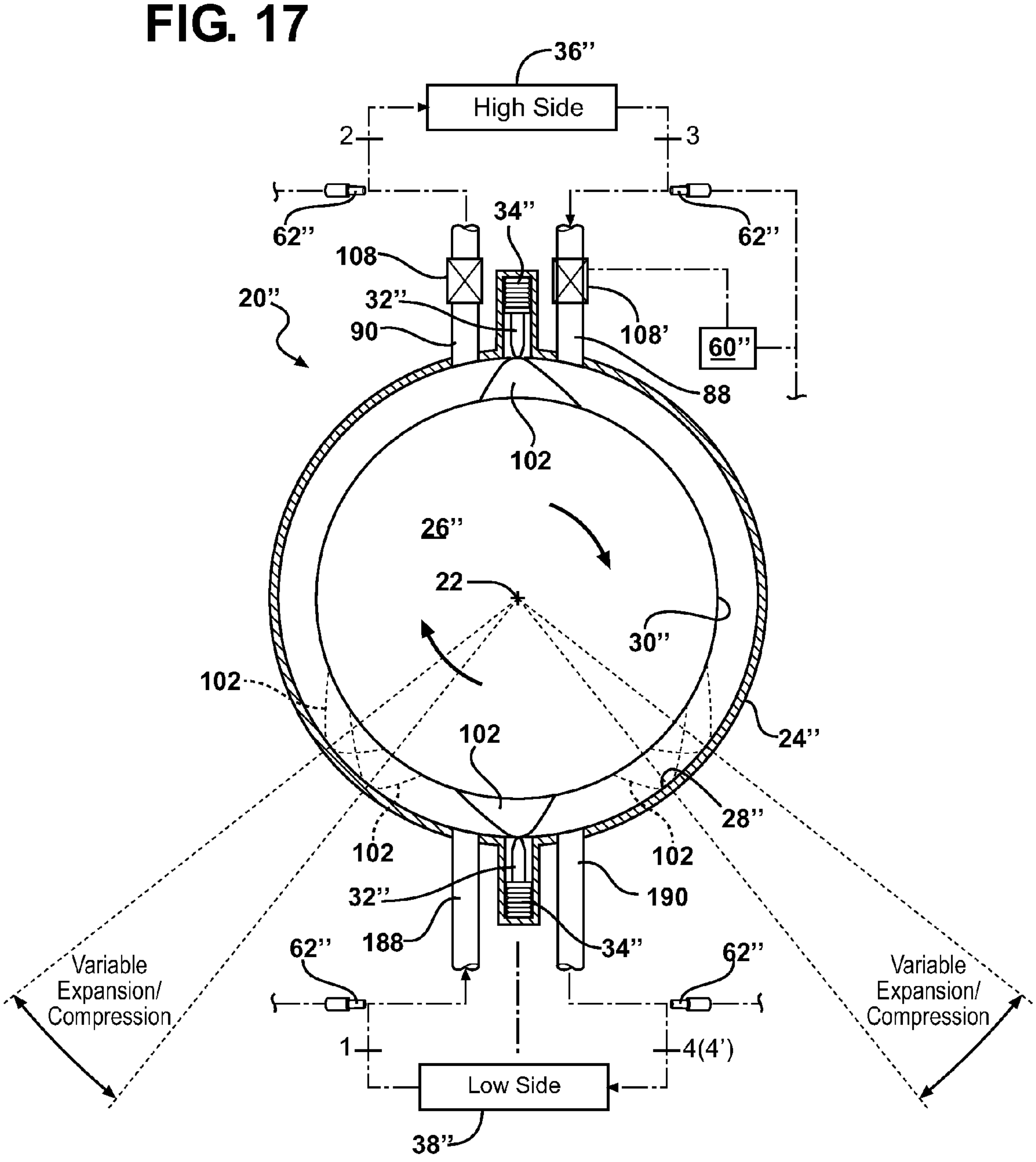
FIG. 17 is a simplified cross-sectional view of the rotary compressor/expander device of FIG. 11 configured in a unique thermodynamic system and having its two lobes oriented at top and bottom dead center positions.

FIG. 17 depicts the rotary vane-type positive displacement device 20" of FIGS. 11-16 operating with a thermodynamic system in which the plumbing has been rearranged, thus illustrating the versatility of this particular construction. In this design, the left side of the rotary device 20" functions as the compressor and the right half as the expander. A high-pressure side heat exchanger 36" is operatively disposed at the top (considering the schematic presentation in FIG. 17) of the device 20" between an outlet 90 from the compression chamber in an inlet 88 to the expansion chamber. A low side heat exchange 38" is operatively disposed between an outlet from the expansion chamber 190 and an inlet to the compression chamber 188. The thermodynamic system configured according the schematic representation of FIG. 17 can operate within three modes. The high-pressure side heat exchanger 36", which functions as a heat rejecter, represents any high pressure, high temperature zone relative the low-pressure side heat exchanger 38". When these heat exchangers are connected in a closed-loop configuration, the overall system would be engineered to match target temperatures. The low side heat exchanger 38" could be engineered to operate at any pressure dictated by the application. Alternatively, the high-pressure side heat exchanger 36" could be simply opened to atmosphere for the pressures chosen, and in that configuration operate in an open air cycle cooling system. Conversely, the low-pressure heat exchanger 38" could be replaced by ambient atmosphere in an open loop arrangement, thereby providing an air cycle heating system. In this arrangement also, a valve 108 controls the flow of working fluid through the compressor outlet 90, and another valve 108' controls the flow of working fluid through the expander inlet 88.

For the sake of illustration, an exemplary application of the thermodynamic system in FIG. 17 may be configured as an open air cycle heating system, wherein the low-pressure side heat exchanger 38" is open to ambient air exchanges. Assuming air inlet pressure through the compressor inlet 188 is taken at 1.0 ATM, an exemplary cycle may proceed as follows. The valve 108 on the compressor outlet 90 is configured as a check-valve having a fixed or adjustable cracking pressure which coincides with the desired working fluid pressure for the high-pressure side heat exchanger 36". If, for the sake of example, that high-pressure side heat exchanger is intended to operate at 1.2 ATM, then the cracking pressure for the valve 108 may be set at 1.2 ATM. Thus, as the lobe 102 which is positioned at the 6 o'clock in FIG. 17 sweeps past the compression chamber inlet 188, it traps a fixed quantity of a working fluid (i.e., air in this example) in the compression chamber between the leading face of that particular lobe 102 and the retractable valve 32" located in the 12 o'clock position and the closed check-valve 108. Rotation of the rotor 26" in the clockwise direction thus compresses the working fluid until such time as the pressure in the compression chamber reaches the cracking pressure of the valve 108. When the pressure of the working fluid in the compression chamber reaches 1.2 ATM in this example, the valve 108 opens thereby emitting working fluid at the differentiated pressure into the high side heat exchanger 36". This emission of working fluid at the elevated pressure into the high side heat exchanger 36" continues until the lobe 102 crosses the compression chamber outlet 90. All the while, atmospheric air at 1.0 ATM is being drawn into the compression side of the rotary device 20" on the trailing edge of that same lobe 102.

Turning now to the expansion side of the thermodynamic system in the preceding example, working fluid upstream of the valve 108' is maintained at 1.2 ATM. The valve 108' is controlled by a regulator 60" or control system so that it remains open long enough to admit a volume of working fluid into the expansion side of the rotary device 20" so as to achieve the desired operating conditions. The regulator 60" may be configured so as to maintain constant operating pressures, specified volumetric flow rates of the working fluid and/or desired temperature rejections from the high side heat exchanger 36". Alternatively, the regulator 60" may be coupled to rotation of the rotor 26" so that it closes the valve 108' when the rotor 26' reaches a specified angular position. The opening and the closing of valve 108' by the regulator 60" is based, ideally, on the amount of heat moved (in this example via the high side heat exchanger 36"). Thus, considering a lobe 102 crossing the inlet 88, the retractable vane 32" will be closed against the outer surface 30" of the rotor 26" with working fluid at the differentiated pressure (1.2 ATM) filling behind the lobe 102. This lobe 102 will be allowed to rotate sufficiently with the valve 108' in an open condition until the desired volume of working fluid is contained in the expansion chamber.

At this point, which may correspond to one of the phantom representations of a lobe 102 in the 4-5 o'clock positions of FIG. 17, the regulator 60" will cause the valve 108' to close, thereby expanding the working fluid in the expansion chamber. The regulator 60" will time closing of the valve 108' at the appropriate instance so that continued rotation of the lobe 102 will cause the working fluid to be returned to the inlet pressure (1.0 ATM in this example) entirely within the expansion chamber. In most instances, the closing of valve 108' will occur at such a rotary location so that by the time the low trailing edge of the lobe 102 reaches the expansion chamber outlet 190, the pressure of the working fluid in the expansion chamber will be exactly equal to the inlet pressure which, in this example, is atmospheric pressure. The step of adjusting the displacement volume (via regulator 60") of the expansion chamber relative to the compression chamber is based on the amount of heat moved through the heat exchangers 36", 38". The step of returning the working fluid to the inlet pressure occurs without decreasing the volumetric efficiency of either the compression or expansion chamber. In other words, the swept volume of the working fluid, as function of the mass of working fluid actually moved, is not substantially decreased when varying the ratio between volumetric compression and volumetric expansion so that the working fluid can be returned to its inlet pressure.

In some cases, it may be desirable to over expand the working fluid to effect additional cooling, but the working fluid will be returned again to the inlet pressure prior to discharge through the outlet 190. To deliver over-expansion, port 190 would be equipped with a check valve identical to 108 but set to release exhaust at the outlet pressure, in this case 1.0 ATM. Over-expansion would result from exactly the same normal process with the single exception that the inlet valve 108' would be closed sooner. Because a smaller mass of air is admitted behind the rotating lobe 102, its pressure would be reduced below the exit pressure by the time rotating lobe 102 reaches outlet 190. Therefore the check valve set to 1.0 ATM will remain closed. In the following cycle, the lobe 102 leaving TDC will perform compression on the lower pressure over-expanded gas which was just established on its leading edge by the previous sweep of the chamber. As this lobe 102 sweeps clockwise it will perform an ordinary compression sweep as has been described extensively for FIGS. 12-16. As soon as the gas is re-compressed to its exit pressure, check valve (freshly installed on exit port 190) will crack open and release the gas as exhaust. This over-expansion technique, almost by definition, follows the step of returning the working fluid to the inlet pressure. Over-expansion is employed either to quick cool (self-cool) the inner walls of a chamber or to provide a pneumatic flywheel mechanism to temporarily store and balance rotating energy.

In another example of the system shown in FIG. 17, it is possible to operate the rotary device 20" as an air cycle cooling system by opening the high-pressure side heat exchanger 36" to atmosphere in an open loop system. The low side heat exchanger 38", in this example, would be consistent with some space to be cooled which may be rather small in scale like that shown in FIG. 11 or considerably larger. Considering this example from the point at which atmospheric air is taken in through the compression chamber inlet 88, it is assumed that the valve 108' is held open by the regulator 60" until such time as the expansion chamber on the trailing side of a lobe 102 has drawn a sufficient volume of working fluid there behind. Of course, the retractable vane 32" at the 12 o'clock position closes one end of the expansion chamber by riding against the outer surface 30" of the rotor 26". When the lobe 102 reaches a sufficient rotated position like those shown in phantom in the 4-5 o'clock position of FIG. 17, the regulator 60" closes the valve 108' thus trapping a fixed quantity of working fluid in the expansion chamber, which upon continued rotation forcibly reduces the pressure of the working fluid and creates a pressure differential below atmospheric. In this example, it will be assumed that the differentiated pressure reaches a minimum of 0.8 ATM as in preceding examples associated with FIGS. 11-16.

When the trailing side of a lobe 102 crosses the expansion chamber outlet 190, working fluid at the differentiated pressure (0.8 ATM) is emitted to the low side heat exchanger 38", where it absorbs heat in the manner described above. Upon reentering the rotary device 20" through the compression chamber inlet 188, the working fluid now has a higher temperature, but remains at or near the differentiated pressure of 0.8 ATM. The valve 108 associated with the compression chamber outlet 90 is again, in this example, configured as a check valve whose cracking pressure is equivalent to the pressure of the high side heat exchanger 36" which, in this example, is 1.0 ATM or ambient conditions. Thus, the working fluid in the compression chamber (i.e., on the leading edge of lobe 102) re-compresses from differentiated pressure (0.8 ATM) to the inlet pressure (1.0 ATM) until such time as the valve 108 automatically opens. Thereafter, working fluid in the compression chamber is expelled to the high side heat exchanger 36" or atmosphere at the inlet pressure. As will be observed in this example, the step of returning the working fluid to the inlet pressure also includes the step of adjusting the displacement volume of the expansion chamber relative to the compression chamber, via the regulator 60", based on the amount of heat moved during the moving step. Appropriate temperature sensors and/or pressure sensors 62" monitor the amount of heat being moved through one or both of the heat exchangers 36", 38" and provide feedback to make appropriate corrections to close the valve 108' at the precise moment so that heat is moved with the minimum theoretical application of work. These operations occur without decreasing the volumetric efficiency of either the compression or expansion chambers in the manner described. In fact the full volume of all chambers is fully utilized at maximum efficiency at all times.

Of course, the device illustrated in FIG. 17, like the device of FIG. 8 and others, is well-suited to dual use in that the leading and trailing edge of the movable elements (i.e., vanes 34" and/or lobes 102) could readily change function vis-à-vis the compression/expansion and intake/exhaust modes if the rotary direction of the rotor 26" is reversed.

Another novel feature of this device 20" is that the working fluid moves through the four modes of intake, expansion, compression and exhaust modes without a change in lobe 102 direction. That is, the lobes 102 continue rotating with the rotor 26" without requiring a reversal of direction as is characteristic of piston and cylinder devices. Furthermore, it is well know that in the typical piston and cylinder device, peak and minimum pressures are generated when the piston is in its Top Dead Center and Bottom Dead Center positions which usually mean that both ends of the connecting rod are aligned with crank shaft center line. In most piston/cylinder configurations, whenever both ends of the connecting rod align with crank shaft center line, the component of force able to produce or receive torque is zero. Only for those brief instants when then crank arm is offset 90 degrees is the leverage maximized so that the component of force able to produce or receive torque is at its peak value. By contrast to the typical prior art piston/cylinder arrangement, the device 20" presents a configuration in which the peak power can be sustained for a longer percentage of the cycle. In other words, the working fluid either receives mechanical energy from or imparts mechanical energy to the lobes 102 at maximum leverage for a corresponding larger portion of the rotation of the rotor 26". This results in a more efficient, powerful and smoother performance, as compared with a comparable piston/cylinder device. When operated as a combustion engine, it also invites the opportunity to function with a reduced size or weight flywheel, if indeed a flywheel is even needed.

In both of these preceding examples, as well as in a closed loop system which is not described but will be readily understood by one of ordinary skill in the field, a device and method operating in this fashion is effective to move heat with a minimum theoretical application of work. That is, the subject method is effective to extract all of the mechanical energy invested into the working fluid, save frictional and/or heat losses consistent with the second law of thermodynamics. This occurs by adjusting the displacement volume of the expansion chamber relative to the compression chamber on an informed basis without decreasing the volumetric efficiency of the compression or expansion chamber as is common in prior art systems. As a result, the subject invention is capable of operating in a highly efficient manner, recovering or reclaiming all available work that has been put into creating a pressure differential in the working fluid while accounting for inevitable losses due to friction, heat transfer and the like.

It is recognized that a precise definition of "displacement volume" is difficult in the context of variable compression ratio positive displacement compressor-expanders, and perhaps even more confusing in the context of engines having variable expansion ratio, as do at least some of the exemplary devices proposed here. For example, whereas one expert may agree that the variable displacement volume concept is fairly straightforward in the device illustrated in FIG. 6, that same expert may be reluctant to accept a variable displacement volume definition for the device of FIG. 17. In particular, an expert may suggest that the displacement volume of the device shown in FIG. 17 is fixed, choosing instead to hold that its compression volume is variable. In a reciprocating (piston/cylinder) engine with a conventional slider-crank mechanism, the displacement volume is defined as the volume swept by the piston, as the crank moves from a bottom dead-center (BDC) position to a top dead-center (TDC) position. In a conventional engine, the volume swept by the piston during the compression stroke and the expansion stroke is the same, so the definition of displacement volume is unambiguous. In practice, modern implementation of the Atkinson cycle, including the aforementioned Toyota-Atkinson engine, compression ratios are quite low resulting in significant combustion losses, where peak pressures drop precipitously and imep falls significantly. In other words the Toyota-Atkinson engine achieves higher thermal efficiency at a cost of lower engine power output. The invention disclosed here achieves high thermal efficiency and high power output.

Said another way, in the modern implementation of the Atkinson cycle, the compression stroke is effectively shortened by leaving the intake valve open for a time while the piston is moving toward TDC. The air (or air/fuel mixture) that is pulled into the cylinder is pushed back into the intake manifold. When the intake valve finally closes, the actual compression of the charge begins. This approach achieves a smaller compression volume than expansion volume (or smaller compression ratio than expansion ratio), but it means that a smaller amount (mass) of air is trapped in the cylinder. The smaller amount of air means that less fuel can be added and hence less power generated in the cylinder.

It is clear that the Atkinson approach results in wasted piston motion which can be expressed as a reduction in the volumetric efficiency of its engine. This argument is indisputable if the "displacement volume" is defined as the volume swept by the piston. However, if one interprets the displacement volume is the compressed volume, it may not be readily apparent that there is in fact a loss in volumetric efficiency with the Atkinson cycle engine. Notably however, the Toyota-Atkinson implementation requires a full 180 degrees of crank angle to be swept as intake and then another 90 degrees (for instance) is swept again to expel the fluid not taken into combustion, leaving 90 degrees for a stated mass compression. In other words, the Toyota-Atkinson implementation requires 270 degrees of intake activity to produce a 90 degree compression.

In contradistinction, the subject invention proposes a method and apparatus in which all of the working fluid that enters the compression chamber is processed. Moreover, in several of the embodiments, including those depicted in FIGS. 6, 16 and 17, the subject invention can be configured to complete intake-compression-power-and exhaust simultaneously within a single chamber included in an arc easily delivered within 90 degrees. And, depending on scale, it can be accomplished with a torque lever arm much longer than any comparable prior crank driven engine designs. The proposed invention as presented in these embodiments is thus capable of performing intake and compression in the same (for instance) 90 degrees. Present methods of computing volumetric efficiency do not recognize this possibility It can be acknowledged that some difficulty in articulating the distinctions between the subject invention and the prior art, for example with an Atkinson cycle engine, is that the compression volume and the expansion volumes are not the same, making the definition of "displacement volume" somewhat elusive. The literature seems to suggest two approaches to defining displacement volume for such engines. Some define displacement volume to be the expansion volume. The argument used here is that the total size and weight of the engine is dependent on the needed expansion volume. Others define displacement volume to be the compression volume. The argument used here is that this is the volume that determines the amount of air added to the cylinder; and hence fuel that can be added and power that can be generated. For purposes of this invention, the notion of volumetric efficiency can be understood in relation to either approach above—i.e., either compression volume or expansion volume. What matters is the work applied and produced per degree of shaft angle. This is the result of maximum effectiveness of compression and expansion volumes swept per unit of time.

Taking again FIG. 17 as an example, the displacement volume can be seen as equal to the "swept volume" necessary to return the incoming working fluid to its exit pressure. In this case, the (compression) displacement is dependent exclusively on the pressure of the working fluid entering the chamber, which is the difference between the prior expansion exit pressure and the amount of heat absorbed in the low-pressure heat exchanger 38".

Another distinguishing characteristic of this invention becomes apparent when one considers that the modern Atkinson cycle engine is accomplished through control of the intake valve which is the equivalent of throttling. In the methods and devices described in connection with FIGS. 6 and 17, the variable compression and expansion ratios are controlled by the exhaust valves 48/50 and 108, respectively. Comparable exhaust valves do not exist in the Atkinson engine (or other internal combustion engine for that matter). The exhaust valves make it possible to break up the four-stroke cycle that happens in one chamber, into two two-stroke processes that happen in two different chambers. The intake and compression processes are accomplished in the compression chamber, and expansion and exhaust processes are accomplished in an expansion chamber. It can be observed that the leading edge of the moving vane or lobe of the several disclosed embodiments of this invention produces both compression and exhaust (or pumping) while the trailing edge of the same rotating member produces both intake (pumping) and expansion. All four may be present in any given angular sweep of the chamber volume. This engine embodiment of the subject invention can provide a smoother application of power than can be achieved with existing engines. For example this device may be configured to complete a power cycle over 90 degrees of crank rotation as opposed to a prior art single cylinder position engine which would require 720 degrees of rotation to complete the cycle. This yields an advantage of 8:1. In addition, the torque arm may be designed longer than a crank by multiples, allowing the device to run at lower pressures. And advantageously, 100% of the pressure would be exerted tangentially 100% of the time compared to a traditional piston which reaches this capability only for an instant (at 90 degrees) once every other cycle.

Figure 18:
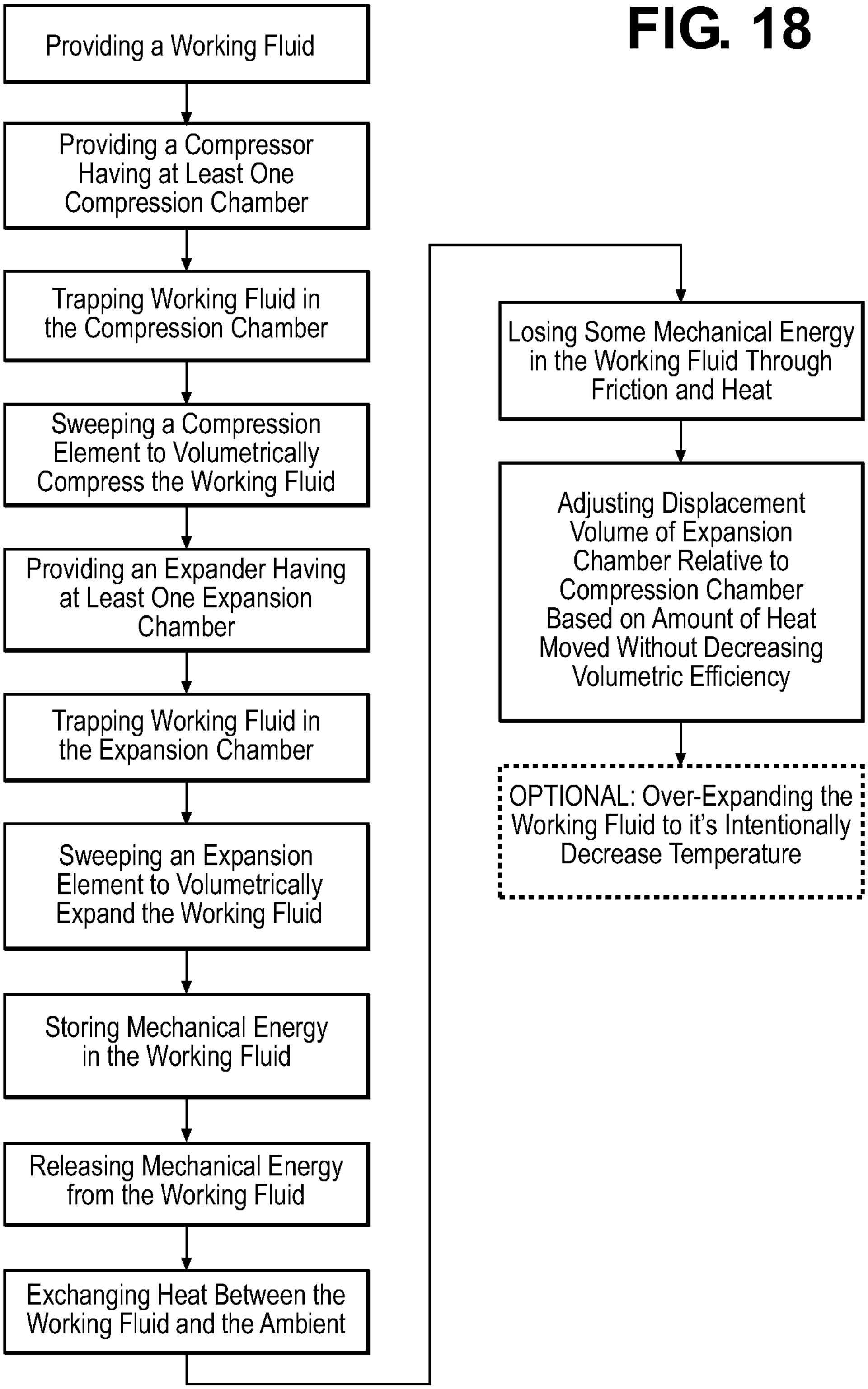
FIG. 18 is a conceptual flow diagram depicting certain working steps of the subject method.

FIG. 18 describes a simplified, logic diagram according to certain principles of this invention. The final functional block, identifiable by broken lines, describes an optional step in the process whereby the working fluid can be over-expanded, in appropriate situations, to intentionally decrease its temperature. For example, referring to the example of FIG. 10 which describes a combustion engine process, hot combustion gases entering the expander section 20' may benefit from overexpansion, i.e., beyond or below atmospheric pressure, so as to decrease the temperature in the working fluid in order to cool the chamber walls without resorting to water jacket cooling pumps and radiators, or reducing the demands thereof. In some applications, the resulting parasitic loads associated with internal self-cooling may be fully justified. In certain applications it could be demonstrated that the incurred load is less than any practical alternative because overexpansion reduces the exit temperature of the originating process thereby increasing initial thermal efficiency, and returns all the energy required except for the actual work equivalent of heat removed.

The ability to independently and continuously vary to the compression and expansion ratios of the engine offers several advantages in an engine application. One advantage is that engines based on the subject device will not suffer decreased performance when operated at high elevations. For example most conventional spark-ignition engines, with a fixed swept volume and compression ratio, will suffer a reduction in power at high elevations due to the reduction in air density. The mass of air pulled into the engine is nominally $m_{air}=\rho_a V_d$, where $\rho_a$ is the density of the air and $V_d$ is the displacement volume for the engine. Since the air density is low at high elevations, the mass of air pulled into the engine is reduced for any give cycle of the engine. The amount of fuel that can be added (and still maintain stoichiometric ratios for combustion) is reduced, and hence the power output of the engine is reduced. This is similar to the power loss which is produced more severely in the Toyota-Atkinson implementation.

Figure 1A:
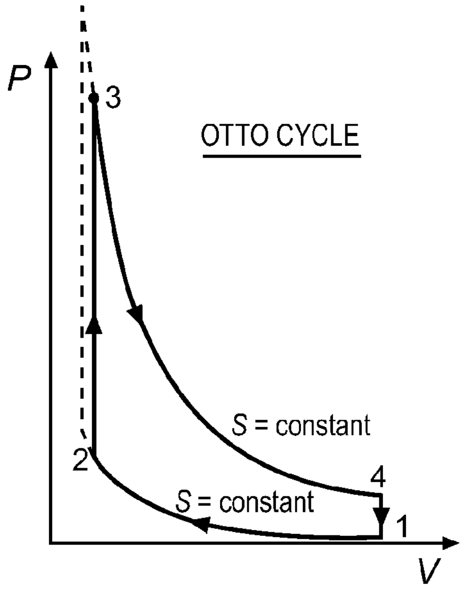
FIGS. 1A and 1B describe the idealized Otto cycle in PV and Ts diagrams, as well known in the art.
Figure 1B:
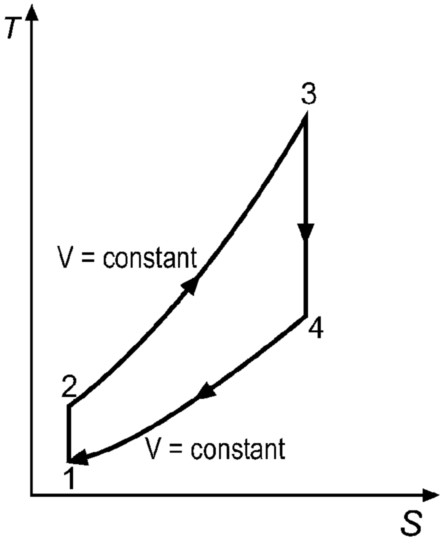
Figure 1C:
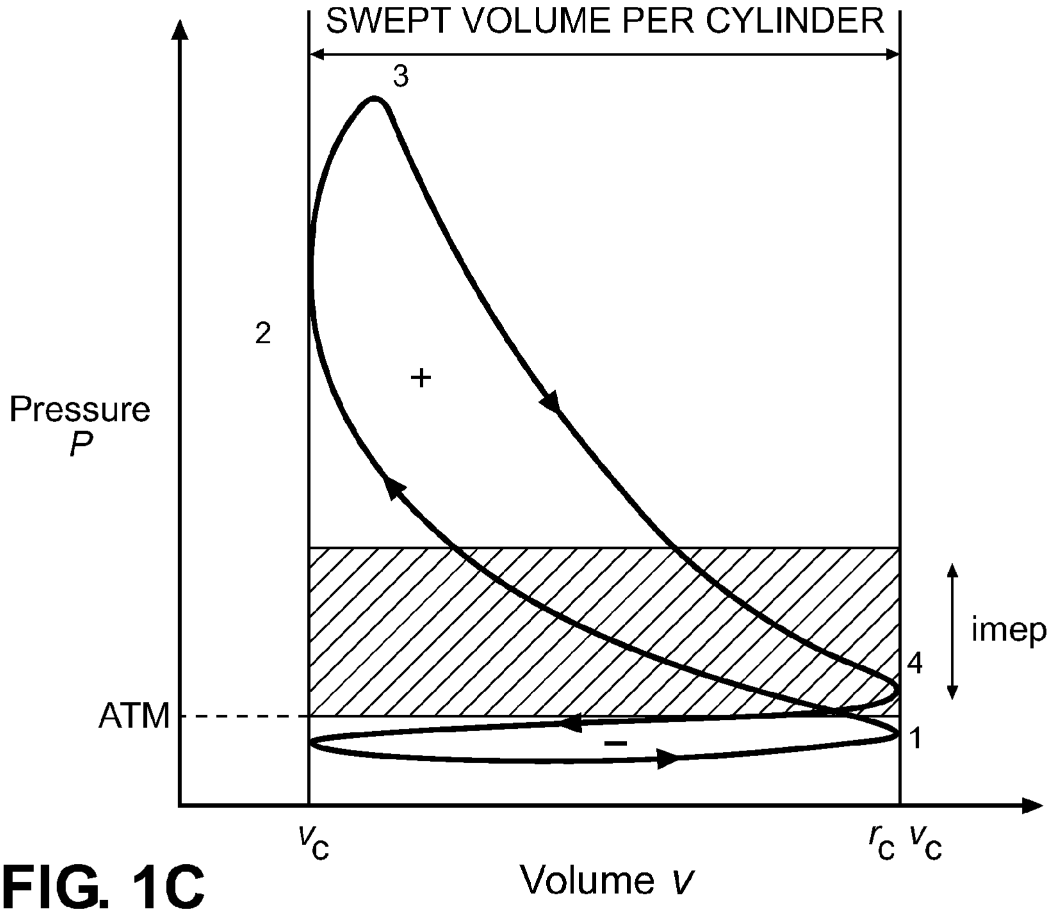
FIG. 1C is a PV diagram showing the actual measured pressure inside a prior art spark ignition internal combustion engine operating at steady state near wide open throttle.

A subject engine would be capable of increasing the compression ratio to compensate for a decrease in air density, and possibly even super-charging on demand. The dashed line in FIG. 1A shows the potential increase in work output for an engine following an Otto cycle when the compression ratio is raised from 8 to 9. The work per cycle of the engine is represented by the area within the curve. Mathematically, it is expressed as: $w=\int pdv$. Thus, FIG. 1A is an example of an Otto cycle at two different compression ratios, and indicates an increase in the included area (and hence the work output) at the higher compression ratio.

In another scenario the ability to vary the compression ratio can be used to offset a problem with low octane fuel. Spark-ignition engines are prone to auto-ignition of the fuel air mixture, particularly when low octane fuel is used. Auto-ignition (commonly referred to as engine knock) can be very damaging to an engine. Modern engines have a sensor to detect knock. When knock is detected the engine controller retards the spark advance. This retarding of the spark means that the fuel will not be completely burned by the end of the cycle and results in a waste of some of the fuel energy.

An engine configured in accordance with the subject invention would be effective to reduce the compression ratio as needed, to eliminate knock if it is detected. Since there is no need to retard the spark, the fuel that is burned will be utilized fully. The ability to independently and continuously vary the expansion ratio relative to the compression ratio is relevant to the subject device's ability to extract the maximum available amount of work from a working fluid in a thermodynamic system. For the purposes of this description, the mechanical energy is defined as the energy that can be recovered from the working fluid through purely mechanical means. As a result, the working fluid is expanded (or re-compressed, as the case may be) until its pressure reaches equilibrium with its pre-compressed (or pre-expanded, as the case may be) condition before it is allowed to leave the working chambers of the engine or pump device. In open loop systems, the pre-compressed or pre-expanded condition will be surrounding atmospheric pressure.

Figure 1D:
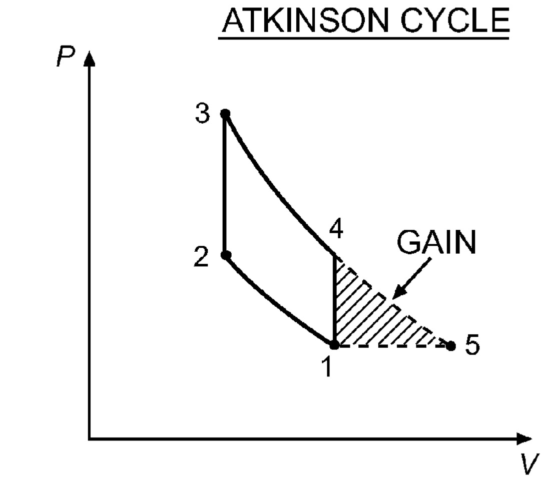
FIGS. 1D and 1E describe the potential gains or efficiencies available when expansion of the working fluid is structured so as to return the working fluid to its starting (inlet) pressure at the end of the cycle (state 5)
Figure 1E:
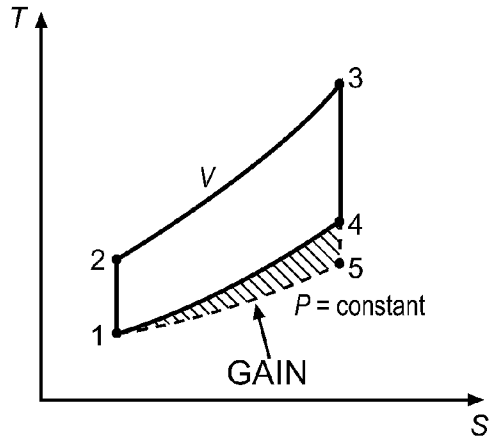

The work that could be recovered from an Otto cycle engine by completely expanding the working fluid is shown in FIG. 1D. The work is represented by the area contained in the 'tail' of the PV curve which continues to state 5. In a conventional engine the expansion ratio and the compression ratios are the same. This is indicated in the figure as the volume displaced during compression (between states 1 and 2) and the volume displaced during expansion (between states 3 and 4). The expansion ratio for the subject engine (between states 3 and 5) is nearly three times larger than the compression ratio.

As is well known, work output can be calculated by the area contained within the curve.

The additional work that can be recovered between state points 4 and 5 in FIG. 1D can be calculated from the established equation:

$$w=\int pdV=\frac{p_5v_5-p_4v_4}{1-k}=\frac{R(T_5-T_4)}{1-k}$$

The relative increase in work that this represents depends on many factors including the compression ratio and the amount of fuel burned. The analysis for an example corresponding to FIG. 1D may be summarized as follows:

The temperature at state 1 is assumed to be: $T_1$=300K

The temperature at state 2 is: $T_2=T_1(r_c)^{k-1}=(300\text{K})(8)^{0.4}=689\text{K}$ The work done during compression is:

$$w_{12}=\frac{R(T_2-T_1)}{1-k}=\frac{(0.287)(300-689)}{1-1.40}=-279\text{ kJ/kg}$$

The temperature at state 3 is assumed to be: $T_3$=3187K

The heat added (between 2 and 3) is: $q_{23}=c_v\,(T_3-T_2)=(0.717)(3187-689)=1791$ kJ/kg The temperature at 4 is:

$$T_4=T_3\left(\frac{1}{r_c}\right)^{k-1}=(3187\text{ K})\left(\frac{1}{8}\right)^{0.4}=1387\text{ K}$$

The work recovered during expansion is:

$$w_{34}=\frac{R(T_4-T_3)}{1-k}=\frac{(0.287)(1387-3187)}{1-1.40}=1220\text{ kJ/kg}$$

The net work for the conventional engine is: $w_{net}=w_{12}+w_{34}=(-279)+(1220)=941$ kJ/kg The thermal efficiency for the conventional engine is:

$$\eta_{th}=\frac{w_{net}}{q_{in}}=\frac{941\text{ kJ/kg}}{1791\text{ kJ/kg}}=52.5\%$$

The temperature at 5 is:

$$T_5=T_3\left(\frac{v_3}{v_5}\right)^{k-1}=(3187\text{ K})\left(\frac{0.108}{2.564}\right)^{0.4}=898\text{ K}$$

The worked gained from 4-5 is:

$$w_{45}=\frac{R(T_5-T_4)}{1-k}=\frac{(0.287)(898-1387)}{1-1.40}=351\text{ kJ/kg}$$

The net work for the subject engine is:

$$\begin{aligned}w_{net}&=w_{12}+w_{34}+w_{45}\\&=(-279)+(1220)+(351)\\&=1292\text{ kJ/kg}\end{aligned}$$

The thermal efficiency for the subject engine is:

$$\eta_{th}=\frac{w_{net}}{q_{in}}=\frac{1292\text{ kJ/kg}}{1791\text{ kJ/kg}}=72.1\%$$

Figure 2A:
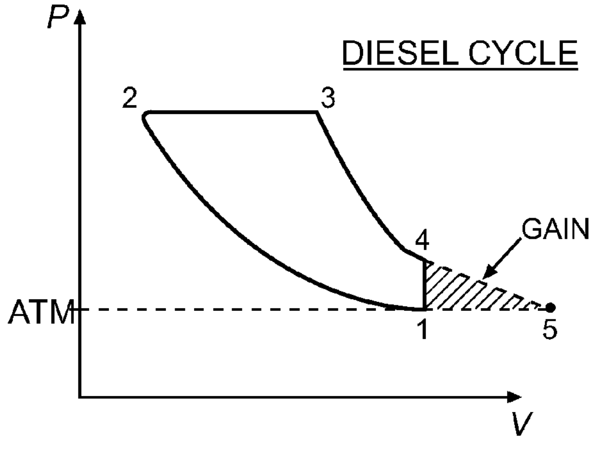
FIGS. 2A and 2B describe diesel- and dual-power cycles, respectively, whereby a gain or improvement in thermodynamic efficiency can be realized by expanding the working fluid during the expansion/releasing step so as to balance the mechanical energy stored in the working fluid during the compression step.
Figure 2B:
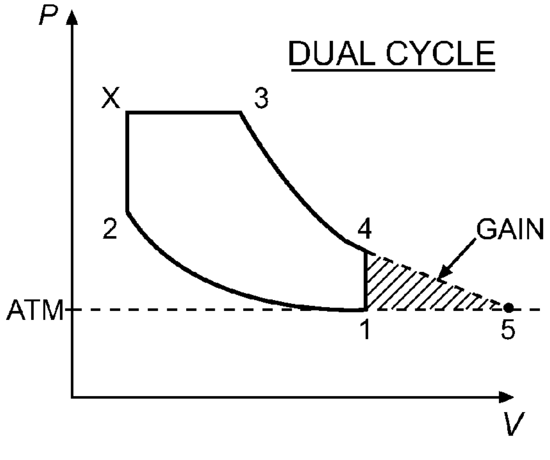

The net work per cycle for the subject engine in this example is 351 kJ/kg (or 37.3%) more than for the conventional engine. The efficiency gain for the subject engine in this example is almost 20%. The actual improvements that could be realized would of course be lower due to friction and other irreversibilities which occur in real engines, but the preceding example shows the significant improvements that can be achieved with this technology. Similar gains in work output and efficiency would be found for other types of internal combustion engines, such as a compression ignition (diesel) engine, as suggested in FIGS. 2A and 2B.

Other engine designers have noticed this potential performance gain and have attempted to harness the energy. For example consider variations on the Atkinson cycle engines that were discussed previously. Both approaches discussed allow for larger expansion ratios than compression ratios, but each approach comes with its own disadvantage.

The valve-timing approach results in wasted piston motion and reduced volumetric efficiency, which may be defined as:

$$\eta_v=\frac{m_{air,actual}}{m_{air,theory}}=\frac{m_{air,actual}}{\rho_{air}V_d}$$

The displacement volume ($V_d$) is the volume swept by the piston in a reciprocating engine. Having the piston sweep through the cylinder without generating an increase in pressure unnecessarily creates additional friction losses. The original approach of Atkinson using a complicated mechanism eliminates the wasted motion at the cost of the complicated mechanism and its associated costs. The subject engine is able to recover all the available mechanical energy without these significant disadvantages.

Figure 3A:
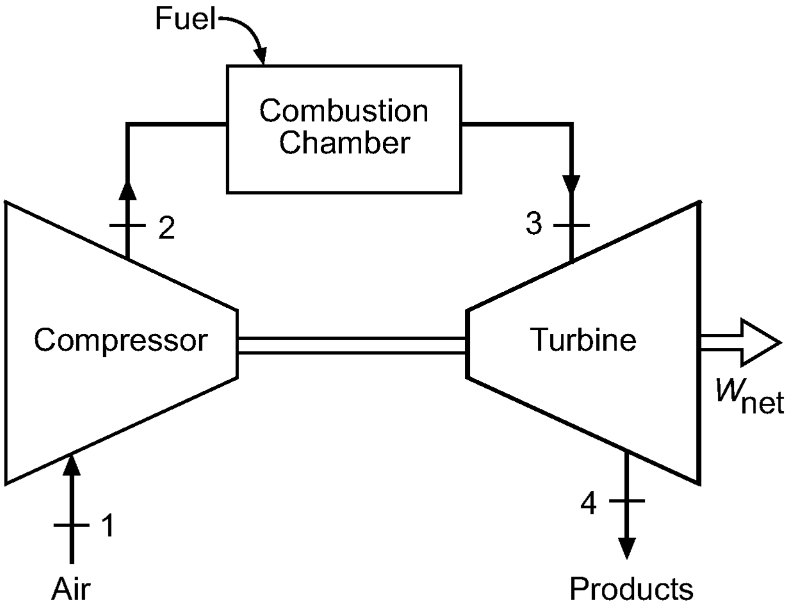
FIGS. 3A and B illustrate the arrangement of open-loop and closed-loop gas turbine systems, respectively.
Figure 3B:
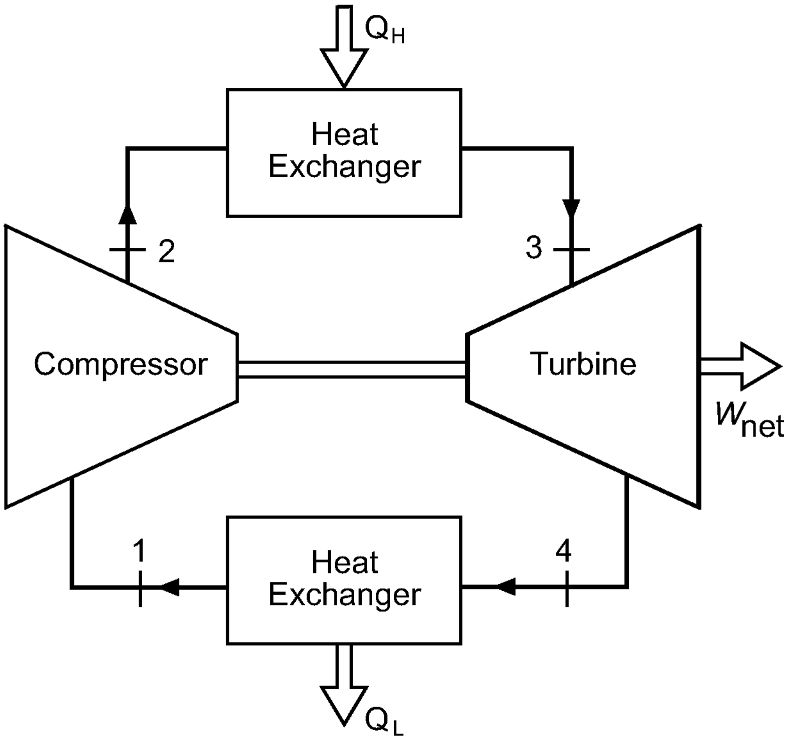
FIGS. 3C and 3D show the Brayton cycle, which is used to model gas turbine systems.
Figure 3C:
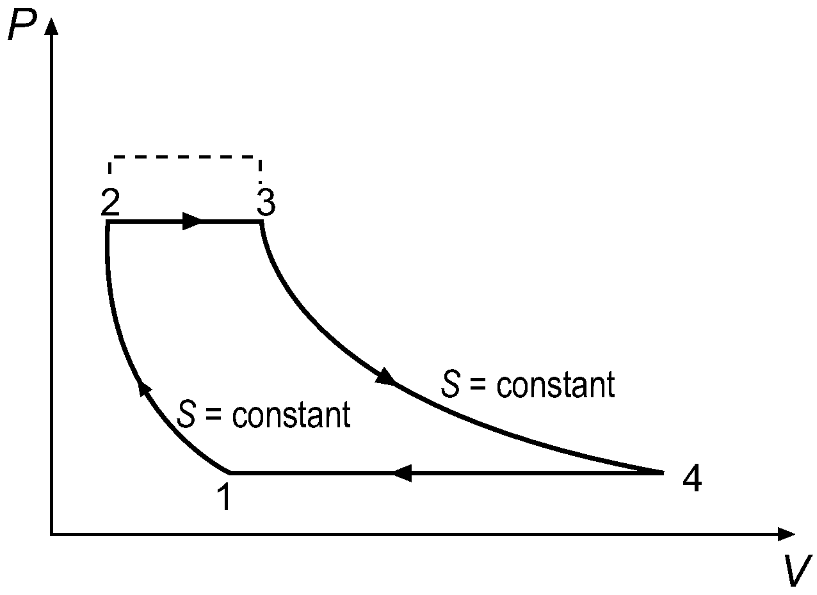
Figure 3D:
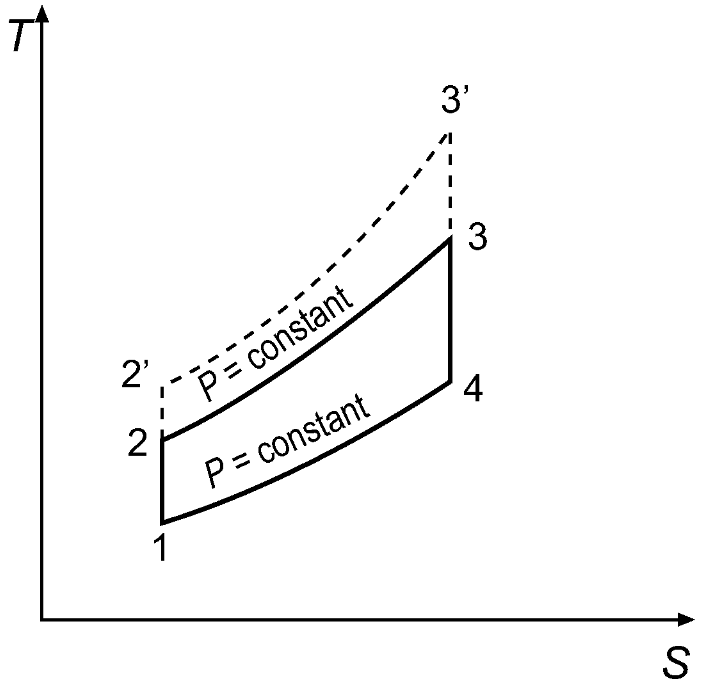

Another embodiment of the subject engine can be configured in an open flow arrangement and operated in a manner similar to a gas turbine. Gas turbines are commonly modeled thermodynamically as a Brayton cycle as shown in FIG. 3C, where the dashed line shows a comparison of the Brayton cycle operating with a compression ratio of 9 versus 8. In both cases the amount of heat added in the process from state 2 to state 3 is kept the same. FIG. 3C shows that increasing the compression ratio will increase the work per one cycle of the engine. Again, this is indicated by the area within the curve.

The work per cycle can be calculated from the following relationship:

$$w_{net}=w_{12}+w_{34}=c_p(T_1-T_2)=c_p(T_3-T_4)$$

For the examples shown in FIG. 3C, this evaluates to slightly lower kJ/kg for a compression ratio of 8 than for a compression ratio of 9. Although the difference in work is small (e.g. on the order of 3-4%) the difference is important. There are two ways to adjust the subject engine to meet a given load demand, either the speed of the engine can be adjusted (as in typical engines) to move more or less air through the engine or the compression ratio can be adjusted (unlike typical engines). This increase in control allows for the engine to be operated more closely to its optimum point. This optimum can change rapidly depending on the engine demand. Under some conditions the engine will be controlled to provide optimum power, in other cases it might be controlled to maximize fuel efficiency or reduce emissions.

When all other factors are equal, it is generally desirable to operate the subject device at as high of a compression ratio as possible. The potential thermodynamic efficiency of a Brayton cycle engine may be shown to be:

$$\eta_{th} = 1 - \frac{T_1}{T_2} = 1 - \left(\frac{p_1}{p_2}\right)^{(k-1)/k} = 1 - (r_c)^{1-k}$$

The thermodynamic efficiency might, for example, evaluate to be 56.5% for an exemplary engine at a compression ratio of 8 and 58.5% for an exemplary engine at a compression ratio is 9.

The subject device may also be used to develop refrigeration systems. One embodiment of the subject device may include configuring positive displacement fluid-handling device to run on the Brayton refrigeration cycle. Conceptually, this cycle is the same as shown in FIG. 3C, except that the state points are run in reverse order (counter-clockwise through the cycle). The Brayton refrigeration cycle performs poorly at the high compression ratios shown in FIGS. 3C, 8 and 9

The factor of merit for a refrigeration system is called coefficient of performance and is defined as:

$$COP_{refrig} = \frac{q_{removed}}{w_{net}}$$

A higher value for COP indicates a more efficient system.

An exemplary comparison of thermodynamic cycles for Brayton refrigeration operating at two different compression ratios is considered now. The exemplary specifications are summarized in Table 1 below. The analysis shows that using a higher compression ratio creates more cooling capacity (92.4 vs. 74.3 kJ/kg), but that the performance of the system is lower (COP=2.04 vs. 2.81) due to the additional work required.

TABLE 1

Summary of Results for Brayton Refrigeration Cycle Example

| | Pressure Ratio | | | | |
|---|---|---|---|---|---|
| | 0.8 | 1.2 | 2 | 3 | 4 |
| Cooling capacity | 9.18 kJ/kg | 5.76 kJ/kg | 45.9 kJ/kg | 74.3 kJ/kg | 92.4 kJ/kg |
| Net work required | 0.60 kJ/kg | 0.31 kJ/kg | 10.0 kJ/kg | 26.4 kJ/kg | 45.2 kJ/kg |
| Coefficient of Performance (Refrig.) | 15.19 | 18.70 | 4.57 | 2.81 | 2.04 |
| COP (Heat Pump) | 16.19 | 19.70 | 5.57 | 3.74 | 3.07 |

In conventional Brayton cycle refrigeration systems, the pressure and compression ratios are fixed. To adjust the cooling capacity of the system, the speed of the system is typically adjusted to change the mass flow rate through the system or the system is simply cycled off and on. In the latter case of duty cycle control methods, it will be recognized that when the system is "on," it is producing much more cooling than is required, which means the power consumed by the device is more than what it needs to be. A much more effective system would be to only produce just enough cooling to meet the cooling load demand. A refrigeration system configured according to principles of this invention enable adjustment of the cooling capacity through changes in the compression ratio and/or changing operating speed of a compressor vs. expander.

One of the important advantages of the Brayton cycle, either in engine applications or refrigeration applications, is the that cycle naturally assures that all the mechanical energy in the working fluid, added by the compressor section, is recovered by the expander section. As has been shown performance gains systems in such as an Otto cycle engine can be had by recovering all the available mechanical energy in the exhaust gases. This principle also has advantages in conventional vapor compression refrigeration systems like those described in connection with FIGS. 4A-4B.

Figure 4A:
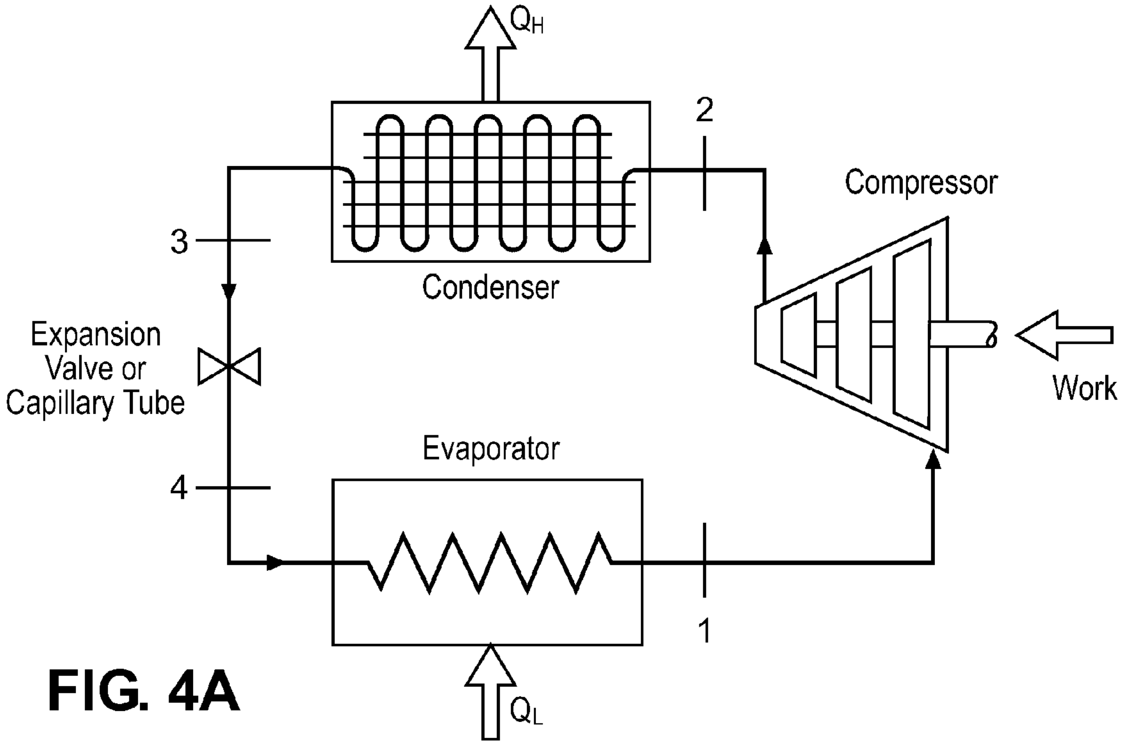
FIGS. 4A and 4B describe a vapor-compression refrigeration cycle.
Figure 4B:
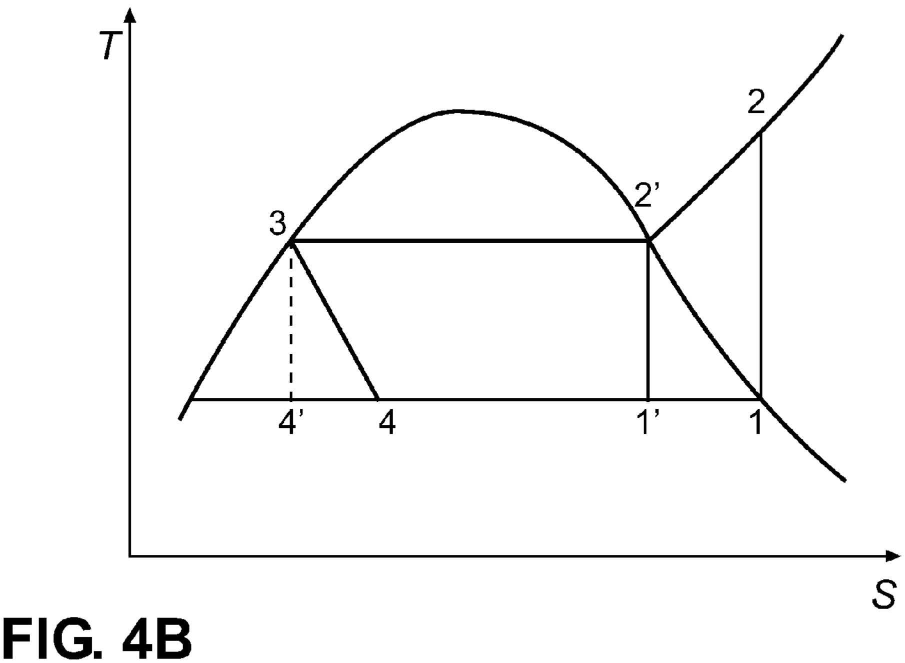

In a conventional vapor compression refrigeration system like that shown in FIGS. 4A-4B, work is done on the working fluid by the compressor between state points 1 and 2. The cold temperatures are generated by flashing the working fluid through an expansion valve between state points 3 and 4. No work is recovered during this process, which is a waste of the mechanical energy contained in the working fluid. A refrigerator configured according to this invention would expand the refrigerant through an energy recovery unit instead of the expansion valve, as shown between state points 3 and 4. The improvement is two-fold; first less net energy is needed to run the system and secondly more cooling is available.

Table 2 below summarizes the benefits of using a subject refrigeration system over a conventional system in the context of a realistic example based on an example problem taken from "Fundamentals of Thermodynamics," 7$^{th}$ Edition, C. Borgnakke and R. Sonntag, John Wiley & Sons, 2009, page 451. The working fluid in the example is R134a and the temperature in the evaporator and condenser are −20° C. and 40° C., respectively.

TABLE 2

Summary of example problem for subject refrigerator

| Quantity | Conventional | Subject Invention | Change |
|---|---|---|---|
| Heat removed (4-1) | 129.6 kJ/kg | 138.9 kJ/kg | 9.3 kJ/kg (or 7.2%) more |
| Net work required | 42.3 kJ/kg | 33.0 kJ/kg | 9.3 kJ/kg (or 22%) less |
| Coefficient of Performance | 3.06 | 4.21 | 1.15 (or 37%) better |

The results demonstrate a potential improvement of 37% in the overall performance of the refrigeration system. The device could also be run as a heat pump, with similar advantages. As before, the subject system also has the advantage of having more control due to the ability to vary the compression ratio, which enables the device to deliver only the amount of cooling needed to meet the cooling load requirement.

In summary the subject device may be used to create heat engines and refrigeration systems that have unique advantages over conventional systems. They are enabled by the ability to continuously vary the relative compression and expansion ratios—without diminishing the volumetric efficiency and the ability to recover all of the mechanical energy from the working fluid at efficiency rates which approach minimum theoretical values.

The foregoing invention has been described in accordance with the relevant legal standards, thus the description is exemplary rather than limiting in nature. Variations and modifications to the disclosed embodiment may become apparent to those skilled in the art, and these fall within the scope of the invention.

What is claimed is:

1. A method for moving a working fluid through a controlled thermodynamic cycle in a positive displacement fluid-handling device, said method comprising the steps of:

providing a working fluid at an inlet pressure, the working fluid comprising a compressible substance capable of intermittently storing and releasing mechanical energy;

providing at least one compression chamber and at least one expansion chamber, each having a respective displacement volume and definable volumetric efficiency;

volumetrically compressing a fixed quantity of the working fluid in the compression chamber, and volumetrically expanding a fixed quantity of the working fluid in the expansion chamber;

creating a pressure differential in the working fluid relative to the inlet pressure during one of said compressing and expanding steps, then moving a variable amount of heat into or out of the working fluid, and then subsequently returning the working fluid to the inlet pressure during the other one of said compressing and expanding steps entirely within the respective compression or expansion chamber; and said step of returning the working fluid to the inlet pressure including adjusting the displacement volume of the expansion chamber relative to the compression chamber based on the amount of heat moved during said moving step without decreasing the volumetric efficiency of the compression and expansion chambers.

2. The method of claim 1 wherein said step of providing at least one compression chamber and at least one expansion chamber includes calculating the volumetric efficiency for each of the compression and expansion chambers by mathematically dividing the mass of working fluid in each chamber during the respective one of said compressing and expanding steps by the product of the density of the working fluid and the displacement volume of the respective compression and expansion chamber.

3. The method of claim 1 wherein said step of adjusting the displacement volume of the expansion chamber relative to the compression chamber based on the amount of heat moved includes controlling at least one of the following: target temperatures, approach temperatures, relative pressure lift, corresponding pressures, and operating costs.

4. The method of claim 1 wherein said step of adjusting the displacement volume of the expansion chamber relative to the compression chamber based on the amount of heat moved includes maintaining asymmetric compression and expansion volumes.

5. The method of claim 1 wherein said step of adjusting the displacement volume of the expansion chamber relative to the compression chamber based on the amount of heat moved includes monitoring the pressure of the working fluid.

6. The method of claim 1 wherein said step of moving a variable amount of heat includes providing a high-side heat exchanger operatively disposed between an outlet from the compression chamber and an inlet to the expansion chamber; providing a low-side heat exchanger operatively disposed between an outlet from the expansion chamber and an inlet to the compression chamber; rejecting heat energy from the working fluid in the high-side heat exchanger; and absorbing heat energy in the working fluid in the low-side heat exchanger.

7. The method of claim 6 wherein said step of adjusting the displacement volume of the expansion chamber relative to the compression chamber based on the amount of heat moved includes dynamically changing the location of at least one of the compressor inlet and expander outlet to alter the thermodynamic efficiency.

8. The method of claim 7 wherein said step of adjusting the displacement volume of the expansion chamber relative to the compression chamber based on the amount of heat moved includes shifting a pair of valve plates having overlapping apertures so that the degree of overlap changes.

9. The method of claim 7 wherein said step of adjusting the displacement volume of the expansion chamber relative to the compression chamber based on the amount of heat moved includes providing at least one rotatable outlet valve plate having an aperture formed therein adjacent the expansion chamber outlet and at least one rotatable inlet valve plate having an aperture formed therein adjacent the compression chamber inlet, and further including the step of maintaining the apertures in the respective outlet and inlet valve plates in direct longitudinally opposed relation to one another.

10. The method of claim 6 wherein said step of adjusting the displacement volume of the expansion chamber relative to the compression chamber based on the amount of heat moved includes manipulating at least one flow control valve operatively associated with the high-side heat exchanger.

11. The method of claim 6 wherein said step of adjusting the displacement volume of the expansion chamber relative to the compression chamber based on the amount of heat moved includes operatively locating a check valve between the outlet from the compression chamber and the high-side heat exchanger, and operatively locating a flow control valve between the high-side heat exchanger and the inlet to the expansion chamber.

12. The method of claim 6 wherein one of said steps of rejecting heat energy and absorbing heat energy includes discharging the working fluid to ambient atmosphere.

13. The method of claim 6 wherein said step of rejecting heat energy includes discharging the working fluid to ambient atmosphere and said step of absorbing heat energy includes combusting the working fluid.

14. The method of claim 1 wherein said step of creating a pressure differential in the working fluid includes radially displacing at least one vane relative to a rotating hub.

15. The method of claim 14 further wherein said step of creating a pressure differential in the working fluid includes co-rotating a compression element and an expansion element within a common housing.

16. The method of claim 14 wherein said step of creating a pressure differential in the working fluid includes co-rotating a compression element and an expansion element within respective housings.

17. The method of claim 14 wherein said steps of volumetrically compressing and volumetrically expanding includes sweeping at least one lobe in a continuous rotational direction.

18. The method of claim 1 wherein said steps of volumetrically compressing and volumetrically expanding include sweeping at least one lobe in a continuous rotational direction while moving the working fluid through modes of intake, expansion, compression and exhaust.

19. A method for moving a working fluid through a controlled thermodynamic cycle in a positive displacement fluid-handling device in such a manner that, in the case of a refrigerator heat is moved with the minimum theoretical application of work and, in the case of a heat engine the maximum theoretical amount of work is extracted from a given movement of heat, said method comprising the steps of:

providing a working fluid at an inlet pressure, the working fluid comprising a compressible substance capable of intermittently storing and releasing mechanical energy;

providing at least one compression chamber and at least one expansion chamber, each having a respective displacement volume and definable volumetric efficiency;

volumetrically compressing a fixed quantity of the working fluid in the compression chamber, and volumetrically expanding a fixed quantity of the working fluid in the expansion chamber;

creating a pressure differential in the working fluid relative to the inlet pressure during one of said compressing and expanding steps, then moving a variable amount of heat into or out of the working fluid, and then subsequently returning the working fluid to the inlet pressure during the other one of said compressing and expanding steps entirely within the respective compression or expansion chamber;

said step of moving a variable amount of heat including providing a high-side heat exchanger operatively disposed between an outlet from the compression chamber and an inlet to the expansion chamber; providing a low-side heat exchanger operatively disposed between an outlet from the expansion chamber and an inlet to the compression chamber; rejecting heat energy from the working fluid in the high-side heat exchanger; and absorbing heat energy in the working fluid in the low-side heat exchanger;

said step of returning the working fluid to the inlet pressure including adjusting the displacement volume of the expansion chamber relative to the compression chamber based on the amount of heat moved during said moving step without decreasing the volumetric efficiency of the compression and expansion chambers; and said step of creating a pressure differential in the working fluid including radially displacing at least one vane relative to a rotating hub.

20. The method of claim 19 wherein said step of adjusting the displacement volume of the expansion chamber relative to the compression chamber based on the amount of heat moved includes shifting a pair of valve plates having overlapping apertures so that the degree of overlap changes.

21. The method of claim 19 wherein said step of adjusting the displacement volume of the expansion chamber relative to the compression chamber based on the amount of heat moved includes providing at least one rotatable outlet valve plate having an aperture formed therein adjacent the expansion chamber outlet, and at least one rotatable inlet valve plate having an aperture formed therein adjacent the compression chamber inlet; and further including the step of maintaining the apertures in the respective outlet and inlet valve plates in direct longitudinally opposed relation to one another.

22. The method of claim 19 wherein said steps of volumetrically compressing and volumetrically expanding include sweeping at least one lobe in a continuous rotational direction while moving the working fluid through modes of intake, expansion, compression and exhaust.

23. A positive displacement rotating vane-type device of the type operated in a thermodynamic cycle, said device comprising:

a generally cylindrical stator housing having a central axis and longitudinally spaced, opposite ends;

a rotor rotatably disposed within said stator housing and establishing an interstitial space therebetween;

a plurality of vanes operatively disposed between rotor and said stator housing for dividing said interstitial space into intermittent compression and expansion chambers;

a compression chamber outlet and an expansion chamber inlet respectively communicating with said interstitial space;

a high-pressure side heat exchanger fluidly adjoining said compressor outlet and said expander inlet;

an expansion chamber outlet and a compression chamber inlet respectively communicating with said interstitial space;

a low-pressure side heat exchanger fluidly adjoining said expansion chamber outlet and said compression chamber inlet; and at least one rotatable outlet valve plate disposed adjacent said expansion chamber outlet with an aperture formed therein for conducting the passage of a working fluid, and at least one rotatable inlet valve plate disposed adjacent said compression chamber inlet with an aperture formed therein for conducting the passage of a working fluid, whereby said outlet and inlet valve plates can be rotated with respect to said stator housing so as to manage the thermodynamic efficiency of said device under varying conditions.

24. The device of claim 23 wherein said at least one rotating outlet valve plate comprises a pair of outlet valve plates having complementary overlapping apertures therein, and said at least one rotating inlet valve plate comprises a pair of inlet valve plates having complementary overlapping apertures therein.

25. The device of claim 23 wherein said aperture in said outlet valve plate is directly longitudinally opposed to said aperture in said inlet valve plate.

26. The device of claim 23 wherein one of said high-pressure side heat exchanger and said low-pressure side heat exchanger comprises ambient atmosphere.

* * * * *